(12) United States Patent
Sakamoto

(10) Patent No.: US 9,614,994 B2
(45) Date of Patent: Apr. 4, 2017

(54) IMAGE READING APPARATUS AND IMAGE READING SYSTEM

(71) Applicant: SEIKO EPSON CORPORATION, Tokyo (JP)

(72) Inventor: Naoki Sakamoto, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/057,320

(22) Filed: Mar. 1, 2016

(65) Prior Publication Data
US 2016/0269585 A1     Sep. 15, 2016

(30) Foreign Application Priority Data

| Mar. 12, 2015 | (JP) | ................................. | 2015-050049 |
| Mar. 12, 2015 | (JP) | ................................. | 2015-050050 |
| Jun. 23, 2015 | (JP) | ................................. | 2015-125542 |
| Jun. 23, 2015 | (JP) | ................................. | 2015-125547 |
| Dec. 2, 2015  | (JP) | ................................. | 2015-235445 |

(51) Int. Cl.
   *H04N 1/04*      (2006.01)
   *H04N 1/12*      (2006.01)
   *H04N 1/10*      (2006.01)

(52) U.S. Cl.
   CPC ......... *H04N 1/1235* (2013.01); *H04N 1/1061* (2013.01); *H04N 1/1215* (2013.01); *H04N 2201/0081* (2013.01); *H04N 2201/0422* (2013.01); *H04N 2201/0456* (2013.01)

(58) Field of Classification Search
   CPC ... H04N 1/1235; H04N 1/1061; H04N 1/1215
   USPC ................................. 358/498, 474, 496, 497
   See application file for complete search history.

(56) References Cited

U.S. PATENT DOCUMENTS

| 6,707,584 B1 | 3/2004 | Morita |
| 2015/0098119 A1* | 4/2015 | Osakabe ............. H04N 1/2034 358/498 |

FOREIGN PATENT DOCUMENTS

| JP | 2000-295392 A | 10/2000 |
| JP | 2008-312043 A | 12/2008 |

* cited by examiner

*Primary Examiner* — Houshang Safaipour
(74) *Attorney, Agent, or Firm* — Workman Nydegger

(57) ABSTRACT

Provided is an image reading apparatus including a first image reading unit which reads a surface of a medium which is transported along a transport path; a second image reading unit which reads a surface of the medium once the medium is mounted on a medium reading surface; and an opening/closing member switch between a closed position and an opened position with respect to the medium reading surface, in which at least a part of the medium reading surface overlaps at least a part of the first image reading unit in an apparatus height direction. In addition, at least a part of the opening/closing member overlaps at least a part of the first image reading unit in the apparatus height direction.

18 Claims, 29 Drawing Sheets

IMAGE READING APPARATUS AND IMAGE READING SYSTEM

BACKGROUND

1. Technical Field

The present invention relates to an image reading apparatus which is represented by a scanner and an image reading system which is configured by a plurality of image reading units via a connector.

2. Related Art

In the related art, image reading apparatuses which read a surface of a medium, so-called scanners, include so-called sheetfed scanners which transport a medium along a transport path and read at least one surface of the medium in an image reading section which is provided in the apparatus, and so-called flatbed scanners in which a medium is mounted so as to adhere to a medium mounting surface so as to read a medium surface which faces the medium mounting surface.

The sheetfed scanners are generally configured so as to be able to set a plurality of sheet media and are able to read a large number of sheet media by separating the plurality of set sheet media one at a time to be sequentially transported along a transport path.

On the other hand, the flatbed scanners read images from media mounted on a medium mounting surface and thus are able to read comparatively thick media such as books or magazines.

Among the users who use these scanners, there are also users demanding both of the two usages of reading a large number of sheet media and of reading comparatively thick media. In response to the demands of these users, there is an image reading apparatus which is provided with both a sheetfed scanner and a flatbed scanner (refer to JP-A-2008-312043).

The image reading apparatus is configured by integrally assembling a flatbed-type image reading mechanism (a flatbed scanner) and an automatic paper feeding-type reading mechanism (a sheetfed scanner). In the image reading apparatus, the flatbed-type image reading mechanism is arranged on the apparatus front side of the automatic paper feeding-type reading mechanism.

A flatbed-type image reading mechanism is provided so as to be freely opened and closed with respect to a platen for mounting a document and is provided with a document cover which is formed with a flat shape. The document cover is able to rotate with a supporting point provided at an end section on the automatic paper feeding-type reading mechanism side as a rotating supporting point and is configured such that the document cover covers a region in which the platen is provided in a state of being closed with respect to the platen. Then, when the document cover is set to an opened state from the state of being closed with respect to the platen, the platen is exposed by rotating the document cover from the front surface side in the apparatus depth direction to the rear surface side, that is, toward the automatic paper feeding-type reading mechanism side, and it is possible to set a medium thereon.

In addition, a paper discharging opening is provided on a front surface of the automatic paper feeding-type reading mechanism. Then, the sheet media which are transported along a transport path which is provided in the automatic paper feeding-type reading mechanism are discharged from the paper discharging opening to the front side in the apparatus depth direction. At this time, by setting the document cover to be in a state of being closed with respect to the platen, it is possible to stack the sheet media which are discharged from the paper discharging opening on an upper surface of the document cover. That is, the document cover of the flatbed-type image reading mechanism also functions as a stacker for the sheet media which are discharged from the automatic paper feeding-type reading mechanism.

Here, the platen and the document cover in the flatbed-type image reading mechanism are arranged further to the apparatus front side than the paper discharging opening in an apparatus depth direction, that is, in the image reading apparatus according to JP-A-2008-312043, the automatic paper feeding-type reading mechanism (a sheetfed scanner) and the flatbed-type image reading mechanism (a flatbed scanner) are merely arranged in order in the apparatus depth direction, and the image reading apparatus is increased in size.

In addition, in the image reading apparatus, since the flatbed-type image reading mechanism and the automatic paper feeding-type reading mechanism are integrally assembled and unable to be separated, transportation of the apparatus is difficult and the transportability is deteriorated due to the increase in the weight of the image reading apparatus.

In addition, in the image reading apparatus, in a case where a malfunction occurs in the flatbed-type image reading mechanism or the automatic paper feeding-type reading mechanism, it is not possible to remove and replace the malfunctioning reading mechanism from the image reading apparatus and when the image reading apparatus is sent for repair in order to repair the malfunctioning reading mechanism, it is also not possible to use the reading mechanism which does not have a malfunction during this time and the user is inconvenienced.

SUMMARY

The invention has been made in consideration of the problems described above and an advantage of some aspects of the invention is to provide an image reading apparatus for which it is possible to reduce the size of the apparatus. In addition, another advantage of some aspects of the invention is to provide an image reading apparatus which is able to improve transportability and convenience.

According to a first aspect of the invention, there is provided an image reading apparatus including a first image reading unit which is able to read a surface of a medium which is transported along a transport path, a second image reading unit which is able to read a surface of the medium once the medium is mounted on a medium reading surface, and an opening/closing member which is provided so as to be able to switch between a closed position and an opened position with respect to the medium reading surface, in which at least a part of the medium reading surface overlaps at least a part of the first image reading unit in an apparatus height direction.

According to the aspect, since at least a part of the medium reading surface (configuring the second image reading unit) overlaps at least a part of the first image reading unit in the apparatus height direction, the second image reading unit is in a state of being inserted in the region of the first image reading unit in a direction which intersects with the apparatus height direction (for example, in many cases, in a direction along the apparatus installation surface), and it is possible to reduce the size of the apparatus in the direction which intersects with the apparatus height direction.

According to a second aspect of the invention, there is provided an image reading apparatus including a first image reading unit which is able to read a surface of a medium which is transported along a transport path, a second image reading unit which is able to read a surface of a medium mounted on a medium reading surface, and an opening/closing member which is provided so as to be able to switch between a closed position and an opened position with respect to the medium reading surface, in which at least a part of the opening/closing member overlaps at least a part of the first image reading unit in an apparatus height direction.

According to the aspect, since at least a part of the opening/closing member (configuring the second image reading unit) overlaps at least a part of the first image reading unit in the apparatus height direction, the second image reading unit is in a state of being inserted in the region of the first image reading unit in a direction which intersects with the apparatus height direction (for example, in many cases, in a direction along the apparatus installation surface), and it is possible to reduce the size of the apparatus in the direction which intersects with the apparatus height direction.

The image reading apparatus according to a third aspect may further include a medium support section which is able to switch between a closed position with respect to the first image reading unit and an opened position with respect to the first image reading unit, the opened position being rotated from the closed position with respect to the first image reading unit to support the medium in a position in which transport is possible on the transport path, in which, in the closed position, at least a part of the medium reading surface overlaps at least a part of the medium support section in the apparatus height direction.

According to the aspect, since, in the closed position, at least a part of the medium reading surface (configuring the second image reading unit) overlaps at least a part of the medium support section (configuring the first image reading unit) in the apparatus height direction, the second image reading unit is in a state of being inserted in the region of the first image reading unit in a direction which intersects with the apparatus height direction (for example, in many cases, in a direction along the apparatus installation surface), and it is possible to reduce the size of the apparatus in the direction which intersects with the apparatus height direction.

The image reading apparatus according to a fourth aspect may further include a discharge unit which discharges a medium which is transported along the transport path in the first image reading unit, in which at least a part of the opening/closing member overlaps at least a part of the discharge unit in the apparatus height direction.

According to the aspect, since at least a part of the opening/closing member (configuring the second image reading unit) overlaps at least a part of the discharge unit (configuring the first image reading unit) in the apparatus height direction, the second image reading unit is in a state of being inserted in the region of the first image reading unit in a direction which intersects with the apparatus height direction (for example, in many cases, in a direction along the apparatus installation surface), and it is possible to reduce the size of the apparatus in the direction which intersects with the apparatus height direction.

The image reading apparatus according to a fifth aspect may further include an image reading section which reads at least one surface of a medium which is transported along the transport path in the first image reading unit, in which at least a part of the opening/closing member overlaps at least a part of the image reading section in the apparatus height direction.

According to the aspect, since at least a part of the opening/closing member (configuring the second image reading unit) overlaps at least a part of the image reading section provided in the first image reading unit in the apparatus height direction, the second image reading unit is in a state of being inserted in the region of the first image reading unit in a direction which intersects with the apparatus height direction (for example, in many cases, in a direction along the apparatus installation surface), and it is possible to reduce the size of the apparatus in the direction which intersects with the apparatus height direction.

The image reading apparatus according to a sixth aspect may further include a discharge unit which discharges a medium which is transported along the transport path in the first image reading unit, and a discharge opening which is provided on the transport path on a downstream side in a transport direction with respect to the discharge unit, in which at least a part of the medium reading surface is positioned between the discharge unit and the discharge opening in a medium discharging direction in the first image reading unit.

According to the aspect, since at least a part of the medium reading surface (configuring the second image reading unit) is positioned between the discharge unit and the discharge opening in a medium discharging direction in the first image reading unit, the second image reading unit is in a state of being inserted in the region of the first image reading unit in the discharging direction, and it is possible to reduce the size of the apparatus in the discharging direction.

In the image reading apparatus according to a seventh aspect, an upper section of the opening/closing member may be formed as a medium mounting section for mounting a medium which is discharged from the first image reading unit, a slope member may be able to be displaced with respect to the opening/closing member is provided in the opening/closing member, and the slope member may take a guide position for guiding the medium which is discharged from the first image reading unit to the medium mounting section in a case where the opening/closing member is in a closed position with respect to the second image reading unit and may take a non-guide position which is retracted from the transport path by being displaced with respect to the opening/closing member in a case where the opening/closing member is switched from a closed position with respect to the second image reading unit to an opened position.

According to the aspect, since the slope member is able to switch between positions with respect to the first image reading unit according to the opening/closing operation of the opening/closing member with respect to the second image reading unit, it is possible to suppress the opening/closing operation of the opening/closing member from being inhibited by the slope member interfering with the first image reading unit.

In the image reading apparatus according to an eighth aspect, the opening/closing member may be provided with a first member which is attached to the second image reading unit so as to be able to rotate and in which the slope member is provided, and a second member which is linked so as to be able to rotate with respect to the first member.

According to the aspect, since, when the opening/closing member is rotated and opened with respect to the second image reading unit, the second member is able to further rotate in the rotation direction with respect to the first member in a state of being opened with respect to the second image reading unit, it is possible to increase the opening angle formed by the medium reading surface and the second member when the opening/closing member is in the opened state with respect to the second image reading unit, operations of replacing or arranging the medium on the medium reading surface are easily carried out, and it is possible to improve the operability of the second image reading unit.

In the image reading apparatus according to a ninth aspect, the slope member may come into contact with the first image reading unit and have a contact section which is able to be displaced with respect to the first image reading unit in the state of being in contact.

According to the aspect, when the opening/closing member is opened and closed with respect to the second image reading unit, it is possible to suppress the opening/closing operation of the opening/closing member from being inhibited by the slope member interfering with the first image reading unit.

In the image reading apparatus according to a tenth aspect, the slope member may extend in a direction which intersects with the medium discharging direction in the first image reading unit, and the contact section may be provided at a position shifted from a region through which the medium passes in the intersecting direction.

According to the aspect, when the slope member is in the guide position, it is possible to reduce the risk of the contact section coming into contact with the medium which is discharged from the first image reading unit. Accordingly, the slope member is able to favorably guide the medium which is discharged from the first image reading unit onto the medium mounting section.

In the image reading apparatus according to an eleventh aspect, the contact section may be configured by a roller member which is able to rotate in a state of being in contact with the first image reading unit.

According to the aspect, since the contact section is configured by a roller member, it is possible to reduce friction occurring between the contact section and the first image reading unit, to easily displace the contact section with respect to the first image reading unit, to avoid the contact section damaging the first image reading unit, or to suppress the degree of damage.

According to a twelfth aspect of the invention, there is provided an image reading system including the image reading apparatus described above, and a connector on which the first image reading unit and the second image reading unit are respectively mounted so as to be able to be attached and detached and which integrates the first image reading unit and the second image reading unit in a state where the first image reading unit and the second image reading unit are mounted.

According to the aspect, since the first image reading unit and the second image reading unit are respectively mounted on the connector so as to be able to be attached and detached, for example, when transporting the image reading system, it is possible to carry out the transporting after detaching at least one of the first image reading unit and the second image reading unit from the connector. That is, since the first image reading unit and the second image reading unit are not transported as an integral member and it is possible to detach the first image reading unit or the second image reading unit and carry out the transportation separately a plurality of times, it is possible to reduce the transport weight per time. As a result, it is possible to improve the transportability of the image reading system.

In addition, in the image reading system, for example, when the first image reading unit or the second image reading unit malfunctions, it is possible to continue using the non-malfunctioning image reading unit even while the malfunctioning image reading unit is detached from the connector and sent for repair. In addition, since it is possible to restore the state of the image reading system by replacing the malfunctioning image reading unit quickly, it is possible to shorten the period during which the image reading system is not able to be used due to the malfunction. Accordingly, it is possible to improve the usability of the image reading system.

In the image reading system according to a thirteenth aspect, the first image reading unit may be mounted on an upper surface of the connector and the second image reading unit may be mounted on the connector from a side of the connector.

According to the aspect, when the first image reading unit and the second image reading unit are mounted with respect to the connector, the first image reading unit is mounted on the connector from above while the second image reading unit is mounted from the side of the connector. Due to this, in the operation of mounting each image reading unit on the connector, since the mounting paths of the first image reading unit and the second image reading unit do not interfere with each other, it is possible to improve the operability of the mounting operations on the connector.

In the image reading system according to a fourteenth aspect, the connector may have a first support surface which is able to support at least a part of a bottom surface of the first image reading unit and a second support surface which is able to support at least a part of a bottom surface of the second image reading unit, the first support surface may be able to support a region with a length of ½ or more of the bottom surface of the first image reading unit in a predetermined direction, and the second support surface may be able to support a region with a length of ½ or more of the bottom surface of the second image reading unit in a predetermined direction.

According to the aspect, the first support surface in the connector is able to support a region with a length of ½ or more of the bottom surface of the first image reading unit in a predetermined direction, and the second support surface is able to support a region with a length of ½ or more of the bottom surface of the second image reading unit in a predetermined direction. That is, when the image reading system is transported in a state where the first image reading unit and the second image reading unit are mounted on the image reading system, since half or more of the bottom surfaces of the first image reading unit and the second image reading unit are supported on the connector, it is possible to suppress the generation of an excessive load on the joining section between the connector and the first image reading unit and the joining section between the connector and the second image reading unit and it is possible to suppress damage to the image reading system.

In the image reading system according to a fifteenth aspect, a handle section may be provided in the connector at a position which corresponds to a center position of the connector in a state where the first image reading unit and the second image reading unit are attached.

According to the aspect, since a handle section is provided in the connector at a position which corresponds to a center position of the connector in a state where the first image reading unit and the second image reading unit are attached, when the image reading system is transported in a state where the first image reading unit and the second image reading unit are mounted on the connector, it is possible to transport the image reading system in a balanced manner, that is, stably.

In the image reading system according to a sixteenth aspect, the connector may be provided with a position regulating section which specifies a position of the second image reading unit in a depth direction.

According to the aspect, when the second image reading unit is moved from the outside to the inside in the depth direction with respect to the connector and mounted on the connector, it is possible to join the second image reading unit with the connector in a state of abutting the position regulating section.

In the image reading system according to a seventeenth aspect, the connector may be provided with a cable relay section at a rear surface side of the position regulating section in the depth direction.

According to the aspect, it is possible to effectively use space in a connector and to suppress an image reading system from being increased in size.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
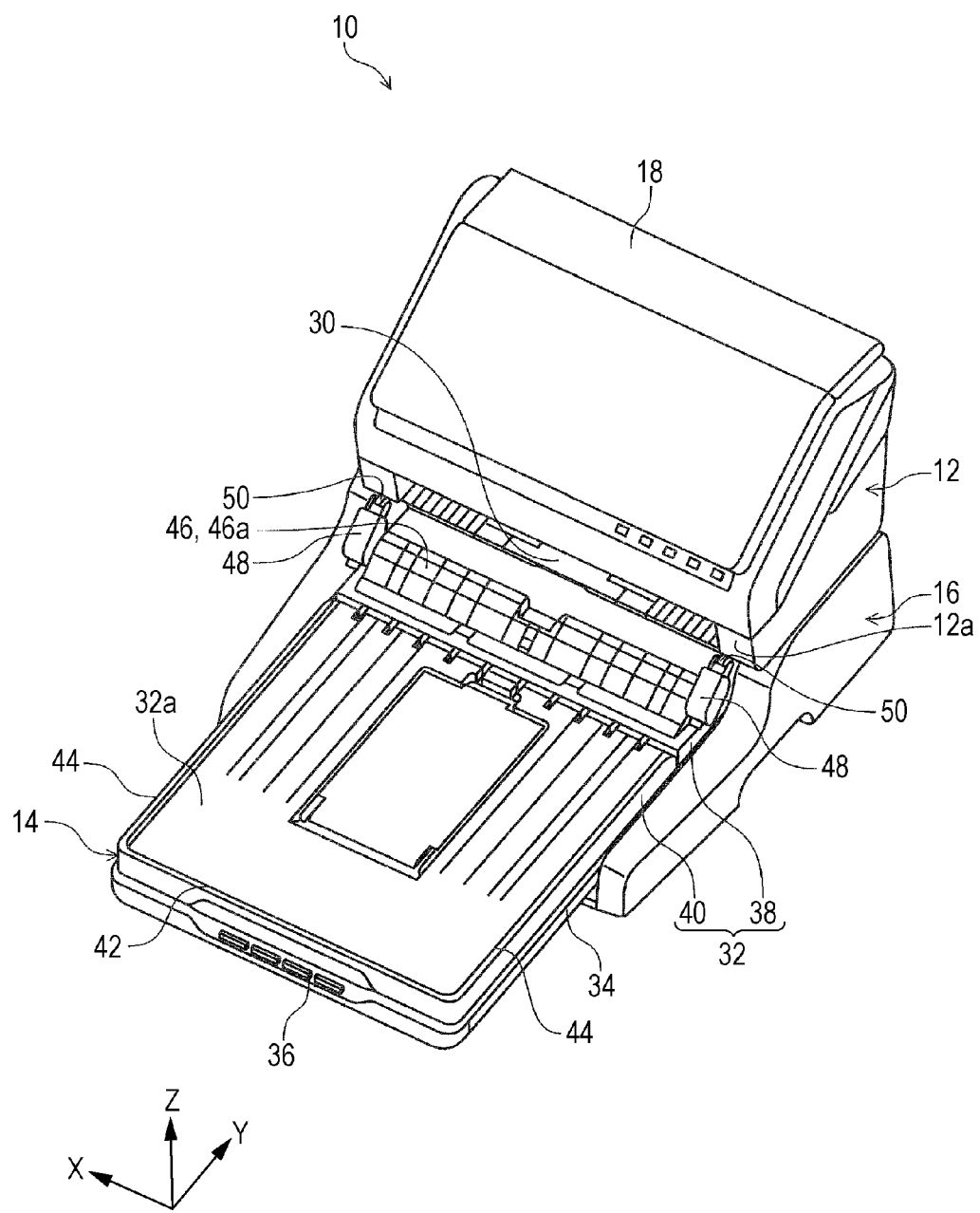
FIG. 1 is an external perspective view of an image reading apparatus.

Description will be given below of embodiments of the invention with reference to the diagrams. Here, the same reference numerals are used for the same configurations in each embodiment, description is only given for the first embodiment, and description of the configuration will be omitted in the subsequent embodiments.

First Embodiment

Figure 2:
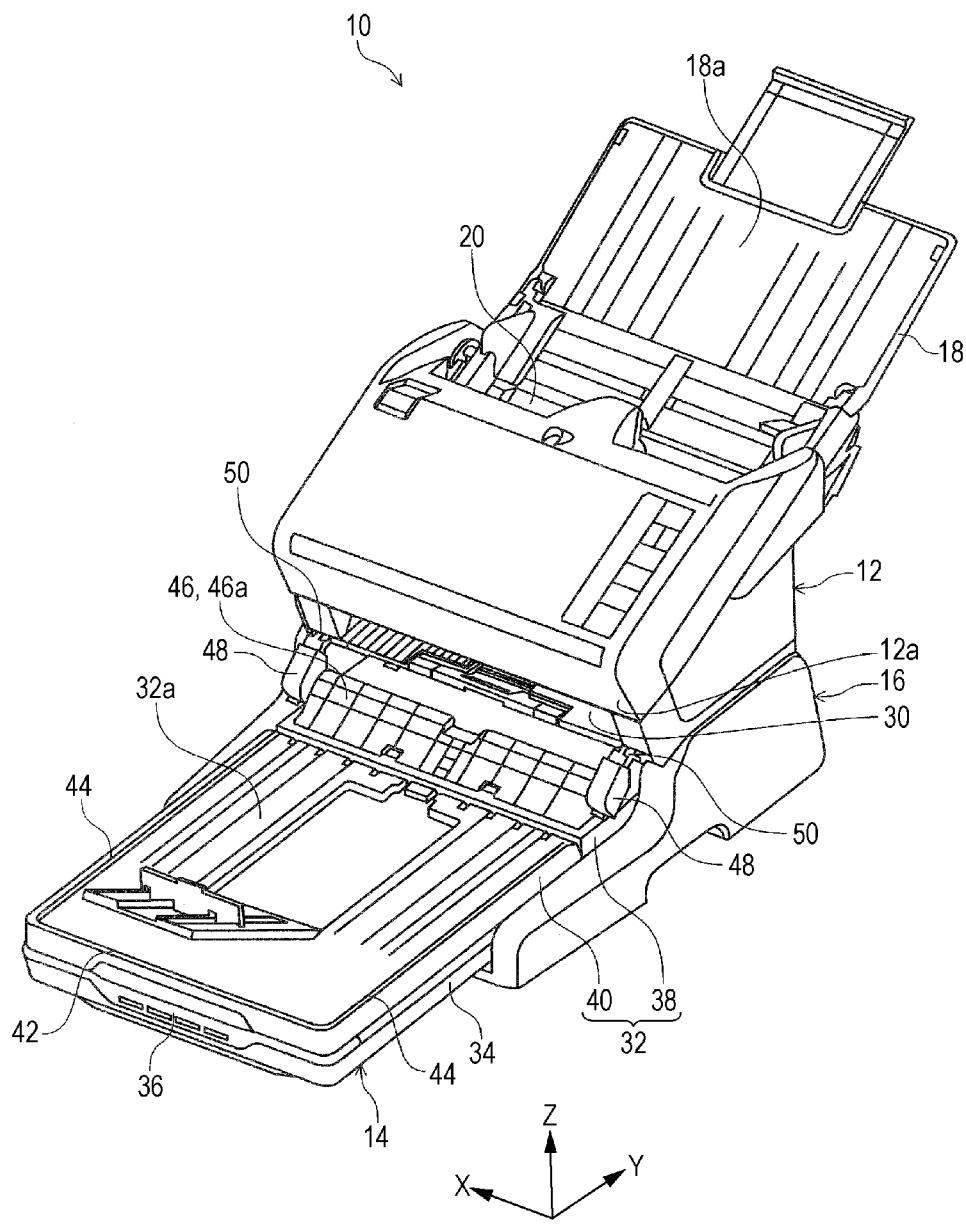
FIG. 2 is an external perspective view of the image reading apparatus.
Figure 3:
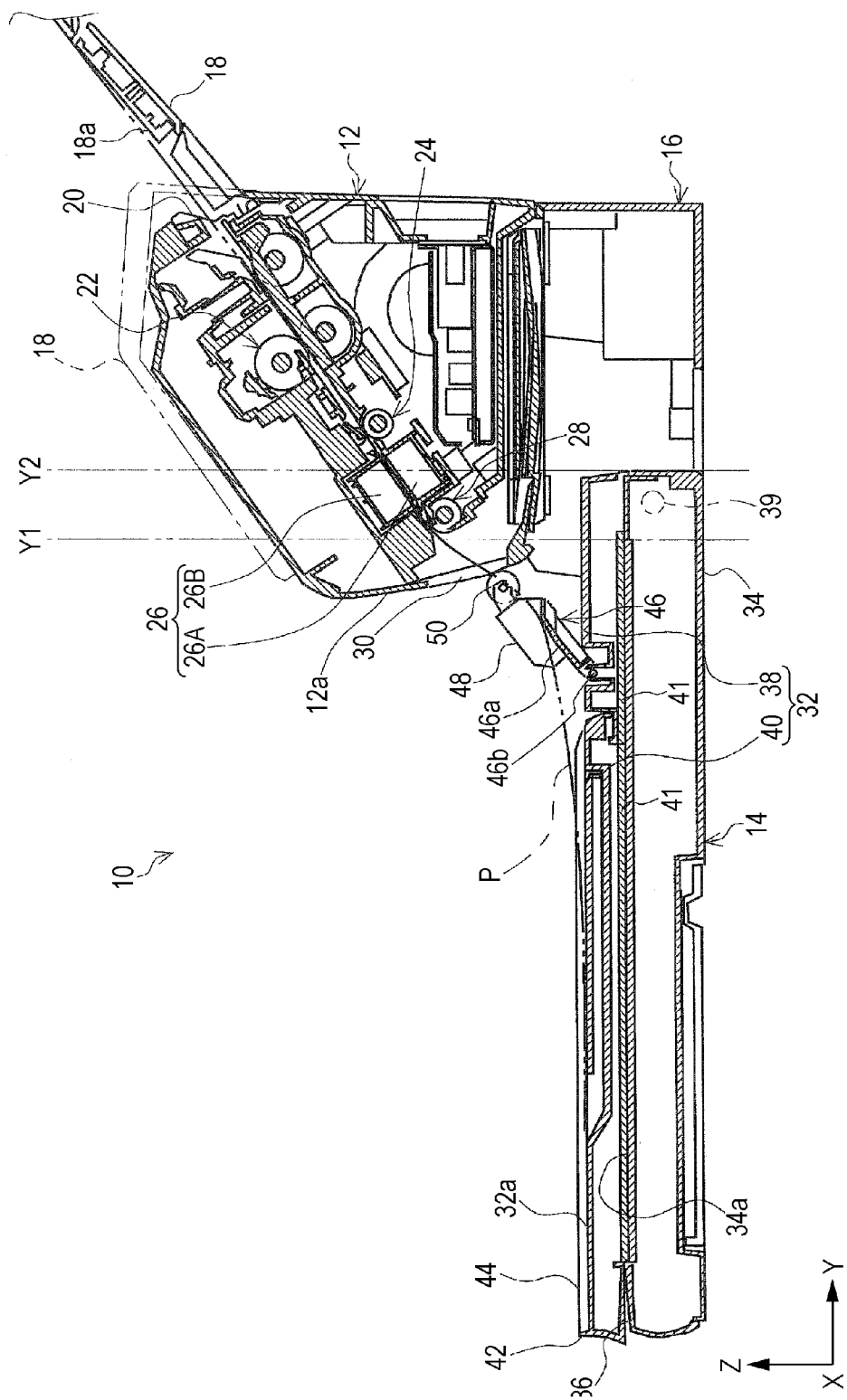
FIG. 3 is a side cross-sectional view which shows a medium transport path of a first image reading unit in the image reading apparatus.
Figure 4:
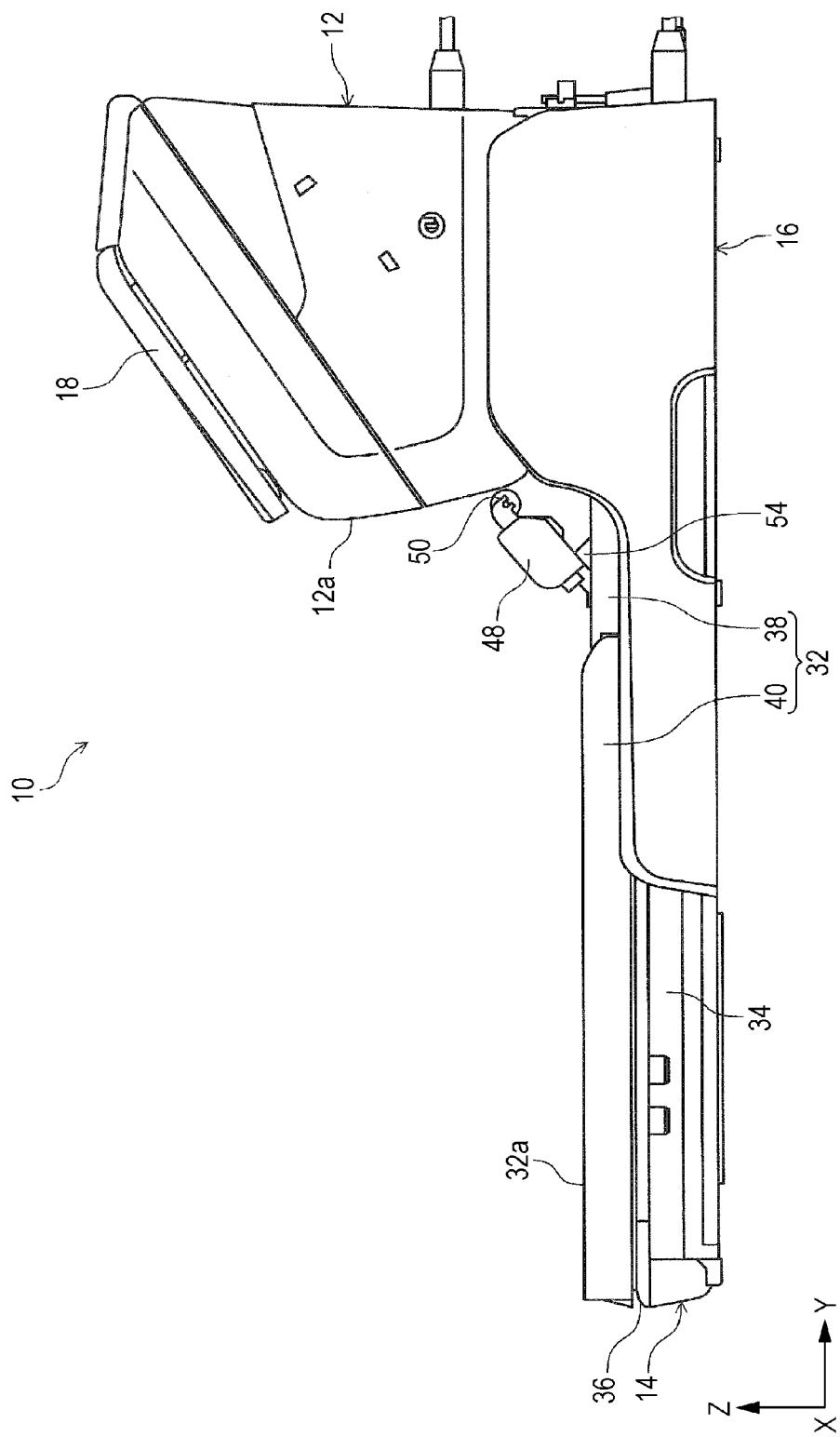
FIG. 4 is a side surface view which shows a state where a cover of a second image reading unit is closed in the image reading apparatus.
Figure 5:
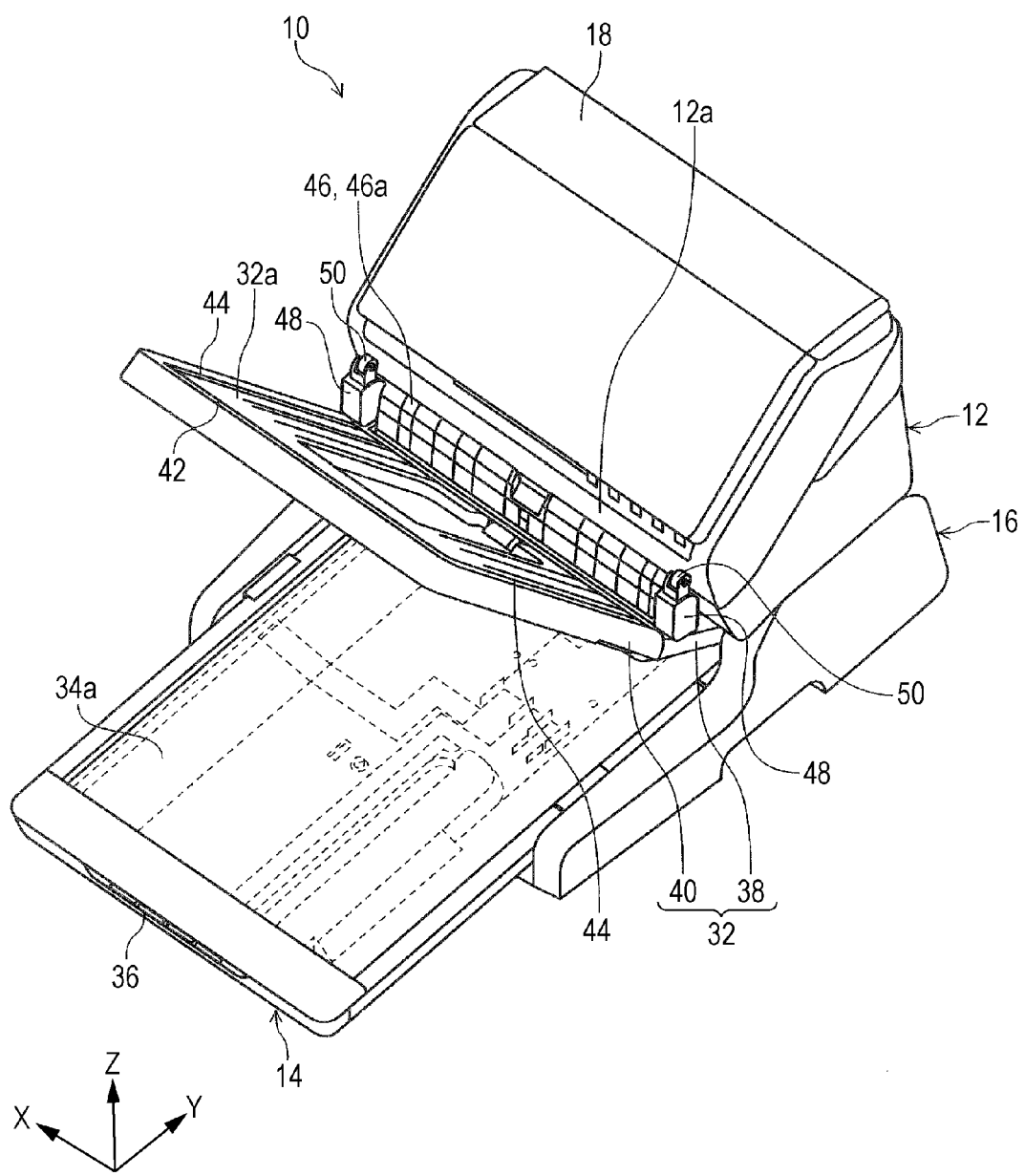
FIG. 5 is a perspective view which shows a state where a cover of the second image reading unit is open in the image reading apparatus.

FIG. 1 is an external perspective view of an image reading apparatus, FIG. 2 is an external perspective view of the image reading apparatus, FIG. 3 is a side cross-sectional view which shows a medium transport path of a first image reading unit in the image reading apparatus, FIG. 4 is a side surface view which shows a state where a cover of a second image reading unit is closed in the image reading apparatus, and FIG. 5 is a perspective view which shows a state where a cover of the second image reading unit is open in the image reading apparatus.

Figure 6:
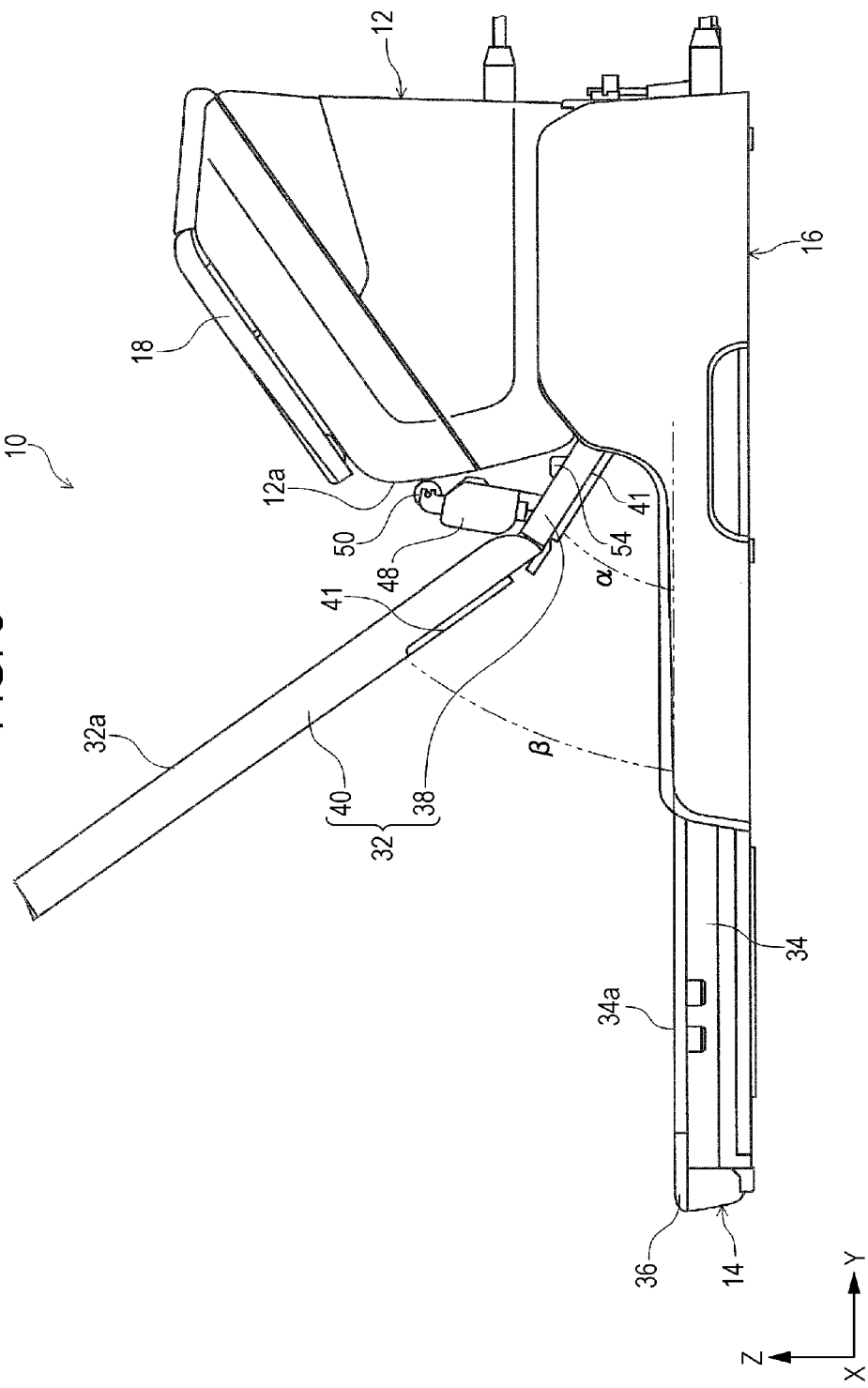
FIG. 6 is a side surface view which shows a state where a cover of the second image reading unit is open in the image reading apparatus.
Figure 7:
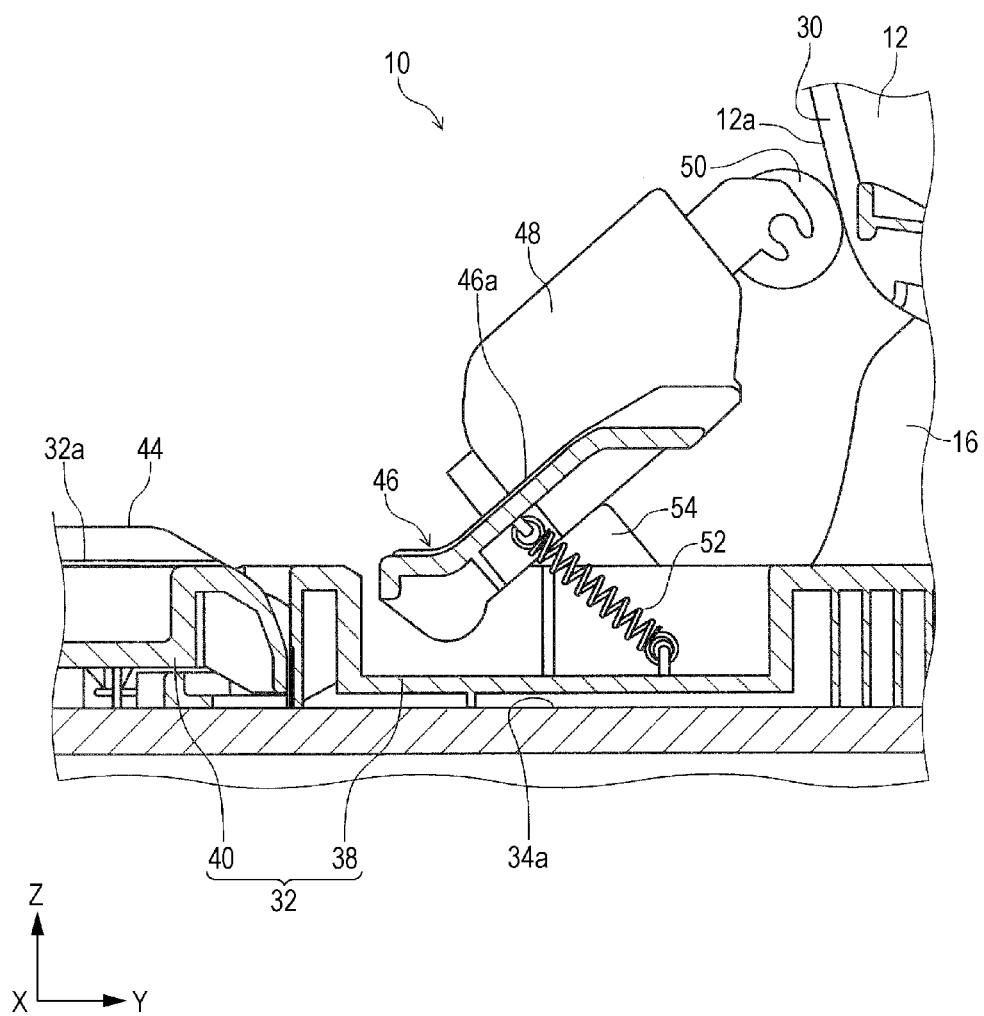
FIG. 7 is a side cross-sectional view of a slope member in the image reading apparatus.
Figure 8:
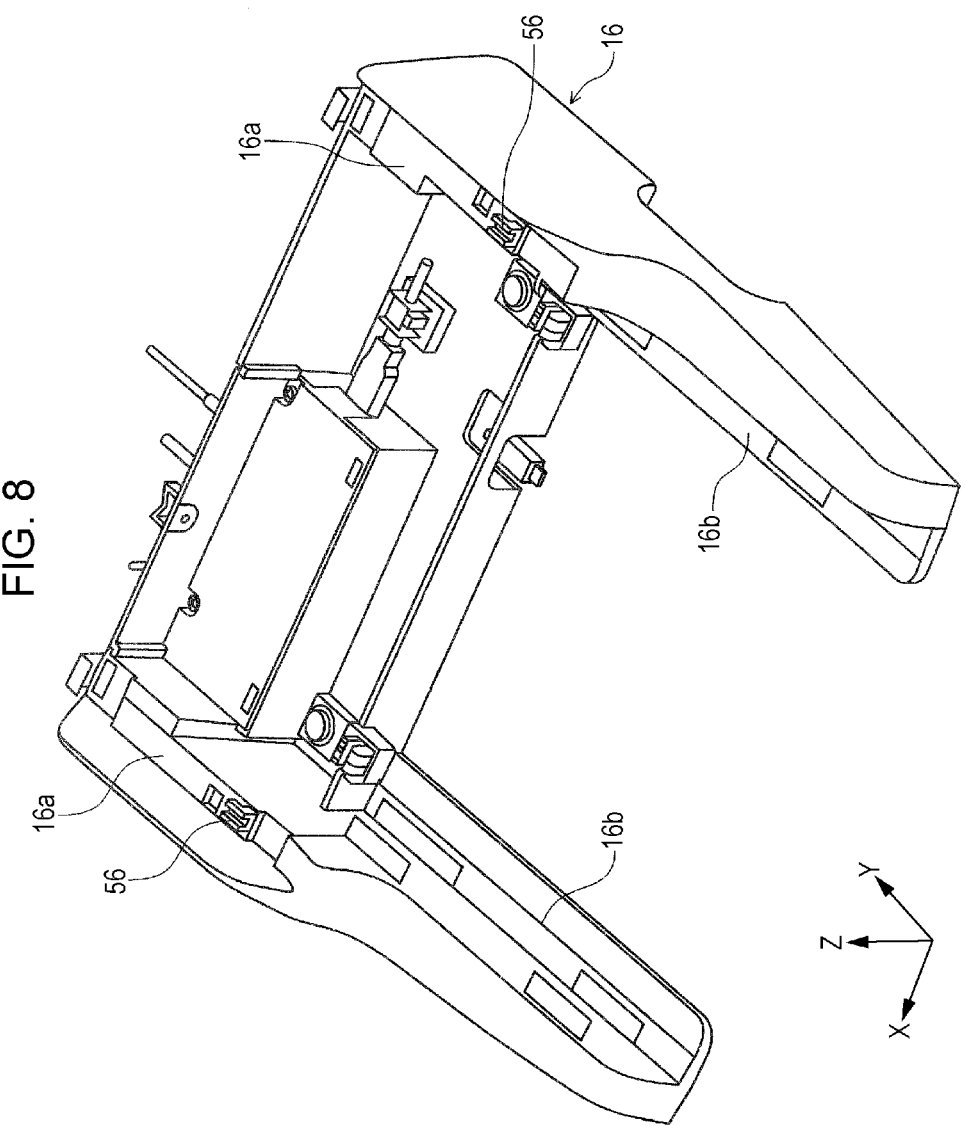
FIG. 8 is a perspective view of a connector of the image reading apparatus.
Figure 9:
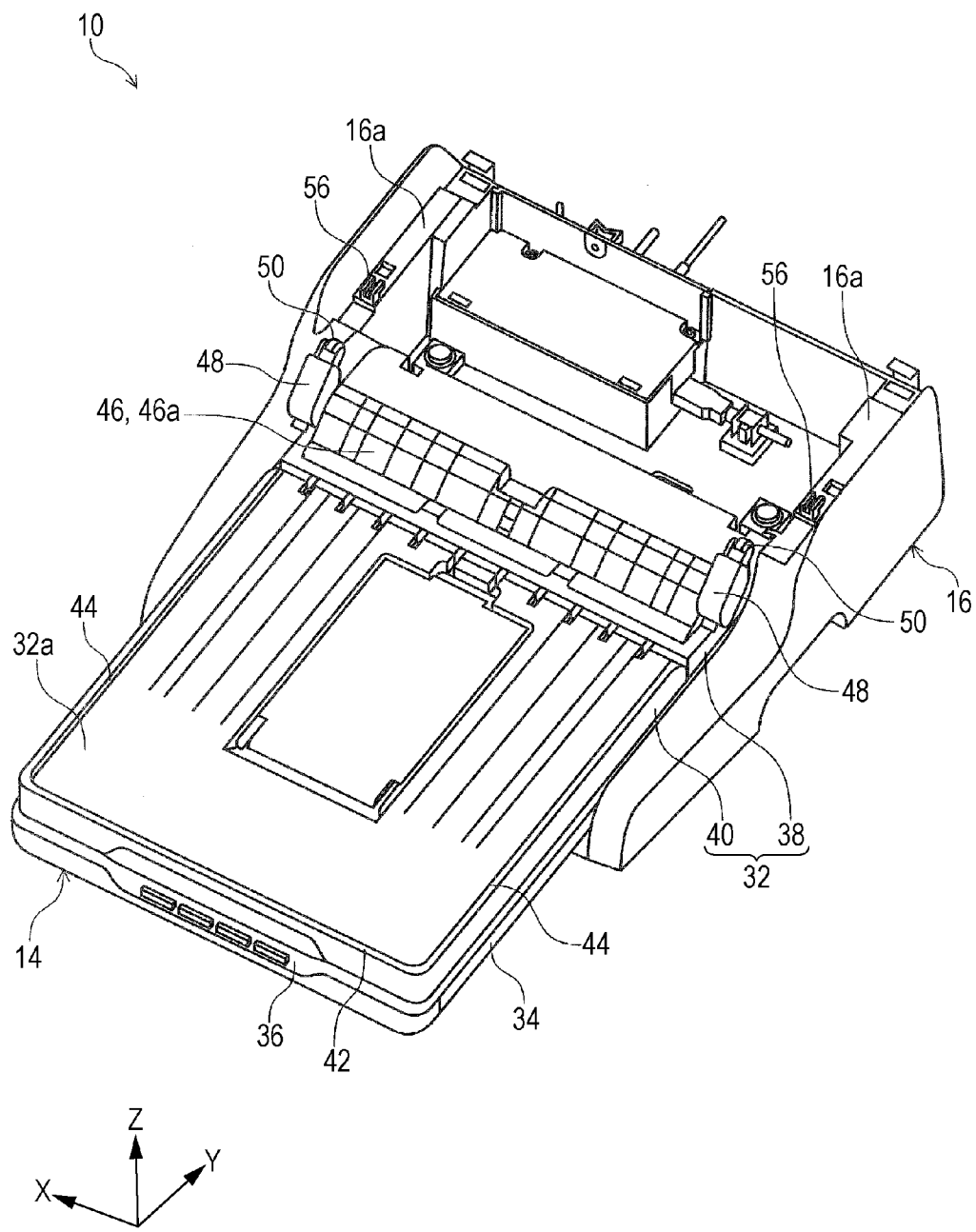
FIG. 9 is a perspective view which shows a state where the second image reading unit is connected to the connector.

In addition, FIG. 6 is a side surface view which shows a state where a cover of the second image reading unit is open in the image reading apparatus, FIG. 7 is a side cross-sectional view of a slope member in the image reading apparatus, FIG. 8 is a perspective view of a connector of the image reading apparatus, and FIG. 9 is a perspective view which shows a state where the second image reading unit is connected to the connector.

In addition, regarding the X-Y-Z coordinate system which is shown in each diagram, the X direction indicates the paper width direction as well as the apparatus width direction, the Y direction indicates the image reading apparatus depth direction, and the Z direction indicates the apparatus height direction. Here, in each diagram, the −Y direction side is the apparatus front surface side and the +Y direction side is the apparatus rear surface side. In addition, in each diagram, the −Y direction is the medium transport direction in the first image reading unit.

Summary of Image Reading Apparatus

An image reading apparatus 10 in the embodiment will be described with reference to FIG. 1 to FIG. 3. The image reading apparatus 10 is provided with a first image reading unit 12, a second image reading unit 14, and a connector 16. In the embodiment, the first image reading unit 12 is connected to an upper section of the connector 16 so as to be able to be attached and detached and the second image reading unit 14 is connected to a front section of the connector 16 so as to be able to attached and detached. Description will be given below of the attachment and detachment of the first image reading unit 12 and the second image reading unit 14 to the connector 16.

In the embodiment, the first image reading unit 12 is configured as a sheetfed scanner and the second image reading unit 14 is configured as a flatbed scanner. Firstly, description will be given of a summary of the first image reading unit 12.

First Image Reading Unit

A medium support section 18 is provided in an upper section on the rear surface side of the first image reading unit 12. The medium support section 18 is attached so as to be able to rotate with respect to the first image reading unit 12. The medium support section 18 may enter a non-feeding state which covers the upper section of the first image reading unit 12 and a feeding opening 20 (refer to FIG. 2) as shown in FIG. 1 and a feeding state which opens the feeding opening 20 by rotating from the non-feeding state to the rear surface side of the first image reading unit 12 as shown in FIG. 2 and allows a medium support surface 18*a* to support a medium P.

Here, to describe the transport path of the medium P with reference to FIG. 3, a pair of feeding rollers 22, a pair of transporting rollers 24, an image reading section 26, a pair of discharging rollers 28 as "discharge means", and a discharge opening 30 are provided in order in the transport direction from the medium support surface 18*a*. A two-dot chain line with the reference sign P in FIG. 3 indicates the transport path of the medium P and the medium P which is supported by the medium support surface 18*a* is nipped by the pair of feeding rollers 22 and fed toward the pair of transporting rollers 24. Then, the pair of transporting rollers 24 nip and transport the medium P to the image reading section 26.

In the embodiment, the image reading section 26 is provided with image reading sensors 26A and 26B. In the embodiment, the image reading sensor 26A is arranged facing one surface (the surface on the lower side in the apparatus height direction) of the medium P so as to be able to read the one surface and the image reading sensor 26B is arranged facing the other surface (the surface on the upper side in the apparatus height direction) of the medium P so as to be able to read the other surface. Then, the image reading section 26 is configured so as to be able to read both surfaces of the medium P using the image reading sensors 26A and 26B. The medium P of which an image is read in the image reading section 26 is nipped by the pair of discharging rollers 28 and discharged toward a medium mounting section 32*a* of a cover section 32 as an "opening/closing member", which will be described below, of the second image reading unit 14, which is positioned in front of the first image reading unit 12, from the discharge opening 30 which is provided on the front surface of the first image reading unit 12.

Second Image Reading Unit

Subsequently, description will be given of a summary of the second image reading unit 14. The second image reading unit 14 is configured as a flatbed scanner. The second image reading unit 14 is provided with a housing 34 and a cover section 32 which is attached so as to be able to rotate with respect to the housing 34. A rectangular medium reading surface 34*a* (refer to FIG. 3 and FIG. 5) is provided in the upper section of the housing 34. In the embodiment, the medium reading surface 34*a* is configured by a flat and transparent glass plate and it is possible to mount the medium P of which an image is read on the upper surface thereof.

In addition, although not shown in the diagram, an image reading means is provided in the housing 34. In the embodiment, the image reading means is configured so as to be able to read a surface which faces the medium reading surface 34*a* of the medium P which is mounted on the medium reading surface 34*a* by moving in the longitudinal direction or the lateral direction of the medium reading surface 34*a* on the lower side of the medium reading surface 34*a*.

In addition, an operating section 36 is provided on the apparatus front surface side (the −Y axis direction side in FIG. 1 and FIG. 2) in the housing 34. The operating section 36 is configured to be provided with a power switch, a setting switching button, and the like for operating the second image reading unit 14.

Furthermore, description will be given of the cover section 32 with reference to FIG. 4 to FIG. 7. In the embodiment, the cover section 32 is attached to the housing 34 so as to be able to switch between a closed position covering the medium reading surface 34*a* and an opened position for exposing the medium reading surface 34*a*. In detail, the cover section 32 is configured so as to be able to rotate with respect to the housing 34. In addition, in the embodiment, the cover section 32 is provided with a first member 38 and a second member 40.

In the embodiment, a rotation shaft 39 (refer to FIG. 3) is provided at an end section on the rear surface side of the first member 38 in the apparatus depth direction. The first member 38 is attached to the end section on the rear surface side of the housing 34 in the apparatus depth direction so as to be able to rotate with respect to the housing 34 with the rotation shaft 39 as a supporting point. In addition, the second member 40 is linked to the end section on the front surface side of the first member 38 in the apparatus depth direction so as to be able to rotate with respect to the first member 38. Here, in the embodiment, the rotation shaft 39 is configured so as to be able to be displaced in the apparatus height direction with respect to the housing 34. Accordingly, it is possible to separate the cover section 32 upward in the apparatus height direction from the medium reading surface 34*a* while maintaining the closed position covering the medium reading surface 34*a*. That is, the cover section 32 is configured to be able to press the medium P even in a state where a comparatively thick medium P is mounted on the medium reading surface 34*a*.

Medium pressing members 41 are respectively provided on the lower surfaces of the first member 38 and the second member 40, that is, surfaces which face the medium reading surface 34*a*. The medium pressing member 41 is configured by an elastic member such as a sponge.

When the cover section 32 is in a closed position (refer to FIG. 3) with respect to the housing 34, the medium pressing member 41 uniformly presses the medium P which is mounted on the medium reading surface 34*a* which is provided in the housing 34 from the opposite side of the target reading surface of the medium P. Due to this, the target reading surface of the medium which is pressed by the medium pressing member 41 is adhered to the medium reading surface 34*a*. That is, the medium pressing member 41 is able to prevent the medium P from rising from the medium reading surface 34*a*. Here, the size of the medium pressing member 41 is set to substantially the same size as the size of the medium reading surface 34*a* so as to be able to press the entire region of the surface on the opposite side to the medium reading surface 34*a* in the medium P which is mounted on the medium reading surface 34*a*.

In addition, the upper surface of the second member 40 is configured as the medium mounting section 32*a* for mounting the medium P which is discharged from the first image reading unit 12. In addition, on the upper surface of the second member 40, a first rib 42 which protrudes upward from the upper surface, that is, the medium mounting section 32*a*, is formed on at least a part of the end section on the front surface side in the apparatus depth direction. In the embodiment, the first rib 42 extends in the apparatus width direction on the upper surface of the second member 40. Accordingly, the first rib 42 is able to regulate the movement of the medium P which is discharged toward the medium mounting section 32*a* from the discharge opening 30 in the discharging direction and reliably mount the medium P on the medium mounting section 32*a*.

In addition, on the upper surface of the second member 40, a second rib 44 which protrudes upward from the upper surface, that is, the medium mounting section 32*a*, is formed on at least a part of at least one of the end sections in the apparatus width direction. In the embodiment, the second rib 44 is formed at both of the ends of the medium mounting section 32*a* in the apparatus width direction and extends in the apparatus depth direction. That is, in the embodiment, the first rib 42 and the second rib 44 are formed at the three end sections apart from the end section on the discharge opening 30 side in the medium mounting section 32*a* which is provided on the upper surface of the second member 40. That is, the medium mounting section 32*a* is surrounded by the first rib 42 and the second rib 44 apart from the end section on the discharge opening 30 side. Accordingly, the first rib 42 and the second rib 44 are able to suppress the medium P which is discharged from the discharge opening 30 toward the medium mounting section 32*a* from falling from the medium mounting section 32*a* and to reliably mount the medium P on the medium mounting section 32*a*.

In addition, a slope member 46 is attached to the upper surface of the first member 38. In the embodiment, the slope member 46 functions as a guide member for guiding the medium P which is discharged from the discharge opening 30 of the first image reading unit 12 to the medium mounting section 32*a* of the second image reading unit 14. The slope member 46 is provided with a guide section 46*a* and engaging sections 48 and 48. The guide section 46*a* is extended in the apparatus width direction. The engaging sections 48 and 48 are provided at both ends of the guide section 46*a* in the apparatus width direction. The engaging sections 48 and 48 are provided at a position separated in the apparatus width direction from a region through which the medium P which is discharged from the discharge opening 30 of the first image reading unit 12 passes. In addition, a contact section 50 is provided at the front end of the engaging section 48. In the embodiment, the contact section 50 is configured as a roller member which is able to freely rotate.

In addition, a rotation shaft 46*b* (refer to FIG. 3) is provided on the front surface side in the apparatus depth direction of the slope member 46. The slope member 46 is attached so as to be able to rotate with respect to the first member 38 with the rotation shaft 46*b* as a supporting point. In the embodiment, the slope member 46 is able to be switched from a guide position (refer to FIG. 3 and FIG. 7) for guiding the medium P which is discharged from the discharge opening 30 of the first image reading unit 12 to the medium mounting section 32*a* of the second image reading unit 14 to a position (FIG. 6) which is retracted from the transport path of the medium P which is discharged from the first image reading unit 12 by rotating the slope member 46 in the counterclockwise direction in FIG. 3 and FIG. 7.

In addition, one end section of bias means 52 is attached to the lower surface of the guide section 46*a* of the slope member 46 as shown in FIG. 7 and the other end of the bias means 52 is attached to the upper surface of the first member 38. In the embodiment, the bias means 52 is configured as a pulling spring. In addition, a specifying section 54 which specifies the position of the slope member 46 by coming into contact with at least a part of the slope member 46 is provided on the upper surface of the first member 38.

As shown in FIG. 7, the slope member 46 is in a state where at least a part of the slope member 46 comes into contact with the specifying section 54 when biased to the first member 38 side by the biasing force of the bias means 52. This state is the guide position of the slope member 46. In this state, the front end of the medium P which is discharged from the discharge opening 30 of the first image reading unit 12 comes into contact with the guide section 46*a* and is guided to the medium mounting section 32*a* of the second image reading unit 14 by the guide section 46*a*. Then, the medium P is mounted on the medium mounting section 32*a*.

In addition, in this state, the contact section 50 of the engaging section 48 comes into contact with the front surface 12*a* of the first image reading unit 12 and the contact position is positioned on the lower side on the front surface 12*a* of the first image reading unit 12.

Slope Member Position Change

When the cover section 32 is in a closed position with respect to the housing 34 as shown in FIG. 3, FIG. 4, and FIG. 7, the slope member 46 comes into contact with the specifying section 54 due to the biasing force of the bias means 52 and takes the medium P guide position. Here, when the end section on the front surface side in the apparatus depth direction of the second member 40 of the cover section 32 is lifted from the housing 34, the second member 40 rotates with respect to the first member 38 in the clockwise direction in FIG. 6. Then, when the second member 40 takes a predetermined angle with respect to the first member 38, the first member 38 also rotates in the clockwise direction in FIG. 5 and FIG. 6 along with the second member 40.

When the first member 38 starts to rotate in the clockwise direction in FIG. 6, the slope member 46 is separated from the specifying section 54 against the biasing force of the bias means 52 and starts to rotate in the counterclockwise direction in FIG. 6 and FIG. 7 with the rotation shaft 46b as a supporting point. At this time, since the contact section 50 of the engaging section 48 is configured as a roller member, the contact section 50 is displaced from the lower side to the upper side of the front surface 12a while rotating with respect to the front surface 12a of the first image reading unit 12. Due to this, the guide section 46a of the slope member 46 is switched from a position for guiding the medium P to a position which is retracted from the transport path of the medium P, that is, to a non-guide position.

Here, since the slope member 46 switches from a guide position to a non-guide position with respect to the front surface 12a of the first image reading unit 12 when the cover section 32 is changed from a closed position to an opened position with respect to the housing 34, it is possible to suppress the slope member 46 from interfering with the first image reading unit 12 and preventing the rotation in the clockwise direction of the first member 38 in FIG. 6.

Due to this, the first member 38 is able to open at an angle α with respect to the medium mounting section 32a of the housing 34. In addition, since the second member 40 is able to rotate to a predetermined angle with respect to the first member 38, the second member 40 is able to open at an angle β which is greater than the open angle α of the first member 38 with respect to the medium mounting section 32a of the housing 34. Here, as shown in FIG. 6, since, in this configuration, the open angle β on the apparatus front surface side is greater than the open angle α on the apparatus rear surface side with respect to the medium mounting section 32a, operations of replacing or arranging the medium P on the medium mounting section 32a are easy.

In addition, by having a configuration which switches between a guide position and a non-guide position, configuring the second member 40 to be able to rotate with respect to the first member 38, and having a configuration in which it is possible to set the open angle with respect to the medium mounting section 32a to be larger on the apparatus front surface side, such that the slope member 46 does not interfere with the first image reading unit 12, it is possible to favorably open the cover section 32 even when the rotation shaft 39 of the first member 38 is provided not on the front side of the first image reading unit 12 in the apparatus depth direction, but in a region which overlaps the first image reading unit 12. That is, arrangement is possible such that at least a part of the first image reading unit 12 and at least a part of the second image reading unit 14 overlap in the apparatus depth direction.

Positional Relationship Between First Image Reading Unit and Second Image Reading Unit Here, description will be given of a positional relationship between the first image reading unit 12 and the second image reading unit 14 in the apparatus depth direction with reference to FIG. 3 again. A two-dot chain line with the reference numeral Y1 in FIG. 3 indicates a position of the end section on the rear surface side in the apparatus depth direction (the Y axis direction in FIG. 3) of the medium reading surface 34a of the second image reading unit 14. In addition, a two-dot chain line with the reference numeral Y2 indicates the position of the end section on the rear surface side in the apparatus depth direction of the cover section 32 of the second image reading unit 14.

At the position of the two-dot chain line Y1 in the apparatus depth direction, at least a part of the medium reading surface 34a overlaps at least a part of the first image reading unit 12 in the apparatus height direction. In more detail, at least a part of the medium reading surface 34a overlaps the medium support section 18 which is in a non-feeding state in the first image reading unit 12. In addition, at least a part of the medium reading surface 34a, more specifically, the end section on the rear surface side in the apparatus depth direction is positioned between the pair of discharging rollers 28 and the discharge opening 30 in the first image reading unit 12 in the discharging direction of the medium P.

In addition, at a position on the two-dot chain line Y2 in the apparatus depth direction, at least a part of the cover section 32 overlaps at least a part of the first image reading unit 12 in the apparatus height direction. In more detail, at least a part of the cover section 32 overlaps the pair of discharging rollers 28 in the apparatus height direction. Furthermore, at least a part of the cover section 32 overlaps at least a part of the image reading section 26 in the apparatus height direction.

To summarize the description described above, since at least a part of the medium reading surface 34a (which configures the second image reading unit 14) in the embodiment overlaps at least a part of the first image reading unit 12 in the apparatus height direction, the second image reading unit 14 is in a state of being inserted in the region of the first image reading unit 12 in a direction which intersects with the apparatus height direction, specifically, in the apparatus depth direction in the embodiment, and it is possible to reduce the size of the apparatus in the apparatus depth direction which is a direction which intersects with the apparatus height direction.

Here, the "the second image reading unit 14 is in a state of being inserted in the region of the first image reading unit 12" may also include a case where the second image reading unit 14 is inserted in the first image reading unit 12 itself. In addition, the case may be either a case where the second image reading unit 14 is not inserted in the first image reading unit 12 itself, but a part of the second image reading unit 14 is hidden in the first image reading unit 12 when the apparatus is viewed from a predetermined direction (for example, the upward direction), or a case where a part of the first image reading unit 12 is hidden in the second image reading unit 14 (the same applies below).

In addition, since at least a part of the cover section 32 (which configures the second image reading unit 14) in the embodiment overlaps at least a part of the first image reading unit 12 in the apparatus height direction, the second image reading unit 14 is in a state of being inserted in the region of the first image reading unit 12 in a direction which intersects with the apparatus height direction, more specifically, in the apparatus depth direction in the embodiment, and it is possible to reduce the size of the apparatus in the apparatus depth direction which is a direction which intersects with the apparatus height direction.

In addition, since at least a part of the medium reading surface 34a (which configures the second image reading unit 14) in the embodiment overlaps at least a part of the medium support section 18 (which configures the first image reading unit 12) in the apparatus height direction in the closed position, the second image reading unit 14 is in a state of being inserted in a region of the first image reading unit 12 in a direction which intersects with the apparatus height direction, more specifically, in the apparatus depth direction in the embodiment, and it is possible to reduce the size of the apparatus in the apparatus depth direction which is a direction which intersects with the apparatus height direction.

In addition, since at least a part of the cover section 32 (which configures the second image reading unit 14) in the embodiment overlaps at least a part of the pair of discharging rollers 28 (which configure the first image reading unit 12) in the apparatus height direction, the second image reading unit 14 is in a state of being inserted in the region of the first image reading unit 12 in a direction which intersects with the apparatus height direction, more specifically, in the apparatus depth direction in the embodiment, and it is possible to reduce the size of the apparatus in the apparatus depth direction which is a direction which intersects with the apparatus height direction.

In addition, since at least a part of the cover section 32 (which configures the second image reading unit 14) in the embodiment overlaps at least a part of the image reading section 26 which is provided in the first image reading unit 12 in the apparatus height direction, the second image reading unit 14 is in a state of being inserted in the region of the first image reading unit 12 in a direction which intersects with the apparatus height direction, more specifically, in the apparatus depth direction in the embodiment, and it is possible to reduce the size of the apparatus in the apparatus depth direction which is a direction which intersects with the apparatus height direction.

In addition, since at least a part of the medium reading surface 34a (which configures the second image reading unit 14) in the embodiment is positioned between the pair of discharging rollers 28 and the discharge opening 30 in the medium discharging direction in the first image reading unit 12, the second image reading unit 14 is in a state of being inserted in the region of the first image reading unit 12 in the medium discharging direction, and it is possible to reduce the size of the apparatus in the discharging direction.

In addition, since the slope member 46 in the embodiment is able to switch the position with respect to the first image reading unit 12 according to an opening/closing operation with respect to the second image reading unit 14 of the cover section 32, it is possible to suppress the opening/closing operation of the cover section 32 from being inhibited by the slope member 46 interfering with the first image reading unit 12.

In addition, since the cover section 32 in the embodiment is provided with the first member 38 which is attached to the second image reading unit 14 so as to be able to rotate and in which the slope member 46 is provided and the second member 40 which is linked so as to be able to rotate with respect to the first member 38, when the cover section 32 is opened by rotating with respect to the second image reading unit 14, the second member 40 is able to further rotate in a rotating direction with respect to the first member 38 which is in an opened state with respect to the second image reading unit 14. As a result, when the cover section 32 is in an opened state with respect to the second image reading unit 14, it is possible to increase the open angle β which is formed between the medium reading surface 34a and the second member 40 and it is possible to facilitate the operations of replacing and arranging the medium in the medium reading surface 34a and to improve the operability of the second image reading unit 14.

In addition, since the slope member 46 in the embodiment has the contact section 50 which is in contact with the first image reading unit 12 and which is able to be displaced with respect to the first image reading unit 12 in the contact state, when opening/closing the cover section 32 with respect to the second image reading unit 14, it is possible to suppress the opening/closing operation of the cover section 32 from being inhibited by the slope member 46 interfering with the first image reading unit 12.

In addition, since the slope member 46 in the embodiment is extended in a direction which intersects with the discharging direction of the medium, that is, in the apparatus width direction in the first image reading unit 12, and the contact section 50 is provided at a position separated from a region through which the medium passes in the apparatus width direction, when the slope member 46 is in a guide position, the contact section 50 is able to reduce the risk of contact with the medium which is discharged from the first image reading unit 12. Accordingly, the slope member 46 is able to favorably guide the medium which is discharged from the first image reading unit 12 to the medium mounting section 32a.

In addition, since the contact section 50 in the embodiment is configured by a roller member, it is possible to reduce friction which is generated between the contact section 50 and the front surface 12a of the first image reading unit 12, it is possible to easily displace the contact section 50 with respect to the first image reading unit 12, and it is possible to avoid the contact section 50 causing damage to the first image reading unit 12 or suppress the degree of damage.

In addition, since the first rib 42 is provided in at least a part of the end section on the downstream side in the medium discharging direction on the upper section of the cover section 32 in the embodiment, when the medium is discharged to the medium mounting section 32a, the first rib 42 comes into contact with the end section on the front end side in the medium discharging direction and regulates the displacement of the medium in the discharging direction, and it is possible to suppress the medium from falling from the medium mounting section 32a in the discharging direction, that is, in the apparatus depth direction.

In addition, since the second rib 44 is provided in at least one end section in the apparatus width direction on the upper section of the cover section 32 in the embodiment, when the medium is discharged to the medium mounting section 32a of the cover section 32, it is possible to suppress the medium from falling from the medium mounting section 32a.

Assembly of Image Reading Apparatus

Subsequently, description will be given of the assembly of the image reading apparatus 10 with reference to FIG. 1, FIG. 8, and FIG. 9. As shown in FIG. 8, the connector 16 is provided with a first attaching section 16a for attaching the first image reading unit 12 and a second attaching section 16b for attaching the second image reading unit 14. The rear surface side of connector 16 is raised upward in the apparatus height direction with respect to the front surface side in the apparatus depth direction. The first attaching section 16a is provided in the raised portion. In addition, the second attaching section 16b is provided on the front surface side of the connector 16. The second attaching section 16b extends to the front surface side in the embodiment and is configured as a pair of arms at intervals in the apparatus width direction.

As shown in FIG. 9, the second image reading unit 14 is arranged between the second attaching sections 16b and 16b in the form of a pair of arms. Then, the second image reading unit 14 is fixed with respect to the connector 16 by a fastening member such as a screw which is not shown in the diagram. Then, by supplying power from the connector 16 to the second image reading unit 14 and performing an operation through the wiring such as data communication, the operation for attaching the second image reading unit 14 to the connector 16 is completed.

Next, the first image reading unit 12 is attached to the first attaching section 16a. Here, locking sections 56 and 56 in a hook form are provided in the first attaching section 16a. In addition, although not shown in the diagram, an engaging section for receiving and engaging the locking sections 56 and 56 is provided on the bottom surface of the first image reading unit 12. After positioning the first image reading unit 12 in the first attaching section 16a and engaging the locking section 56 with an engaging section (which is not shown in the diagram), the first image reading unit 12 is fixed with respect to the connector 16 by a fastening member such as a screw which is not shown in the diagram (refer to FIG. 1).

Then, by supplying power from the connector 16 to the first image reading unit 12 and performing an operation through the wiring such as data communication, the operation for attaching the first image reading unit 12 to the connector 16 is completed.

Here, in the embodiment, in the apparatus depth direction, since at least a part of the first image reading unit 12 and at least a part of the second image reading unit 14 overlap in the apparatus depth direction in a state of being connected to the connector 16, that is, at least a part of the second image reading unit 14 is positioned below the first image reading unit 12 in the apparatus height direction, the second image reading unit 14 and the first image reading unit 12 are connected to the connector 16 in this order.

Modification of First Embodiment (1) In the embodiment, the first rib 42 and the second rib 44 are configured to be provided in the medium mounting section 32a; however, instead of this configuration, only the first rib 42 may be configured to be provided in the medium mounting section 32a.

(2) In the embodiment, the image reading sensors 26A and 26B are configured to be provided in the image reading section 26; however, instead of this configuration, only one of the image reading sensors 26A and 26B may be configured to be provided in the image reading section 26.

(3) In the embodiment, the rotation shaft 39 is configured to be provided on the first member 38 side; however, instead of this configuration, the rotation shaft 39 may be configured to be provided on the housing 34 side.

(4) In the embodiment, the contact section 50 is configured as a roller member; however, instead of this configuration, the contact section 50 may be configured by a resin material or the like and may be configured to slide with respect to the first image reading unit 12. Even with this configuration, it is possible to avoid damaging the first image reading unit 12 or suppress the degree of damage.

To summarize the description described above, the image reading apparatus 10 in the embodiment is provided with the first image reading unit 12 which is able to read a surface of the medium which is transported along the transport path, the second image reading unit 14 which is able to read a surface of the medium mounted on the medium reading surface 34a, and the cover section 32 which is provided so as to be able to switch between a closed position and an opened position with respect to the medium reading surface 34a. At least a part of the medium reading surface 34a overlaps at least a part of the first image reading unit 12 in the apparatus height direction.

In addition, the image reading apparatus 10 is provided with the first image reading unit 12 which is able to read a surface of the medium which is transported along the transport path, the second image reading unit 14 which is able to read a surface of the medium mounted on the medium reading surface 34a, and the cover section 32 which is provided so as to be able to switch a closed position and an opened position with respect to the medium reading surface 34a. At least a part of the cover section 32 overlaps at least a part of the first image reading unit 12 in the apparatus height direction.

In addition, the image reading apparatus 10 is provided with the medium support section 18 which is able to switch between a closed position with respect to the first image reading unit 12 and an opened position with respect to the first image reading unit 12 which supports the medium in a position which is able to be transported on the transport path by rotating with respect to the first image reading unit 12 from the closed position. At least a part of the medium reading surface 34a overlaps at least a part of the medium support section 18 in the closed position in the apparatus height direction.

In addition, the image reading apparatus 10 is provided with the pair of discharging rollers 28 which discharge the medium which is transported along the transport path in the first image reading unit 12. At least a part of the cover section 32 overlaps at least a part of the pair of discharging rollers 28 in the apparatus height direction.

In addition, the image reading apparatus 10 is provided with the image reading section 26 which reads at least one surface of the medium which is transported along the transport path in the first image reading unit 12. At least a part of the cover section 32 overlaps at least a part of the image reading section 26 in the apparatus height direction.

In addition, the image reading apparatus 10 is provided with the pair of discharging rollers 28 which discharge the medium which is transported along the transport path in the first image reading unit 12 and the discharge opening 30 which is provided on the transport path on the downstream side in the transport direction with respect to the pair of discharging rollers 28. At least a part of the medium reading surface 34a is positioned between the pair of discharging rollers 28 and the discharge opening 30 in the medium discharging direction in the first image reading unit 12.

In addition, the upper section of the cover section 32 of the image reading apparatus 10 is formed as the medium mounting section 32a for mounting the medium which is discharged from the first image reading unit 12 and the slope member 46 which is able to be displaced with respect to the cover section 32 is provided in the cover section 32. The slope member 46 takes a guide position for guiding the medium which is discharged from the first image reading unit 12 to the medium mounting section 32a in a case where the cover section 32 is in a closed position with respect to the second image reading unit 14 and takes a non-guide position which is retracted from the transport path by being displaced with respect to the cover section 32 in a case where the cover section 32 is switched from the closed position to an opened position with respect to the second image reading unit 14.

In addition, in the image reading apparatus 10, the cover section 32 is provided with the first member 38 which is attached to the second image reading unit 14 so as to be able to rotate and in which the slope member 46 is provided and the second member 40 which is linked so as to be able to rotate with respect to the first member 38.

In addition, in the image reading apparatus 10, the slope member 46 has the contact section 50 which comes into contact with the first image reading unit 12 and which is able to be displaced with respect to the first image reading unit 12 in the contact state.

In addition, in the image reading apparatus 10, the slope member 46 is extended in a direction which intersects with the medium discharging direction in the first image reading unit 12, that is, in the apparatus width direction, and the contact section 50 is provided at a position separated from a region through which the medium passes in the apparatus width direction.

In addition, in the image reading apparatus 10, the contact section 50 is configured by a roller member which is able to rotate in a state of being in contact with the first image reading unit 12.

In addition, in the image reading apparatus 10, in the cover section 32, the first rib 42 which protrudes upward from the upper section of the cover section 32 and extends in the apparatus width direction is provided in at least a part of the end section on the downstream side in the medium discharging direction in the first image reading unit 12.

In addition, in the image reading apparatus 10, in the cover section 32, the second rib 44 which protrudes upward from the upper section of the cover section 32 and extends in the apparatus width direction is provided in at least a part of at least one of the end sections in the apparatus depth direction.

Here, the invention is not limited to the embodiments described above and various modifications are possible within the range of the invention described in the claims and, needless to say, these are included in the range of the invention.

Second Embodiment

Figure 10:
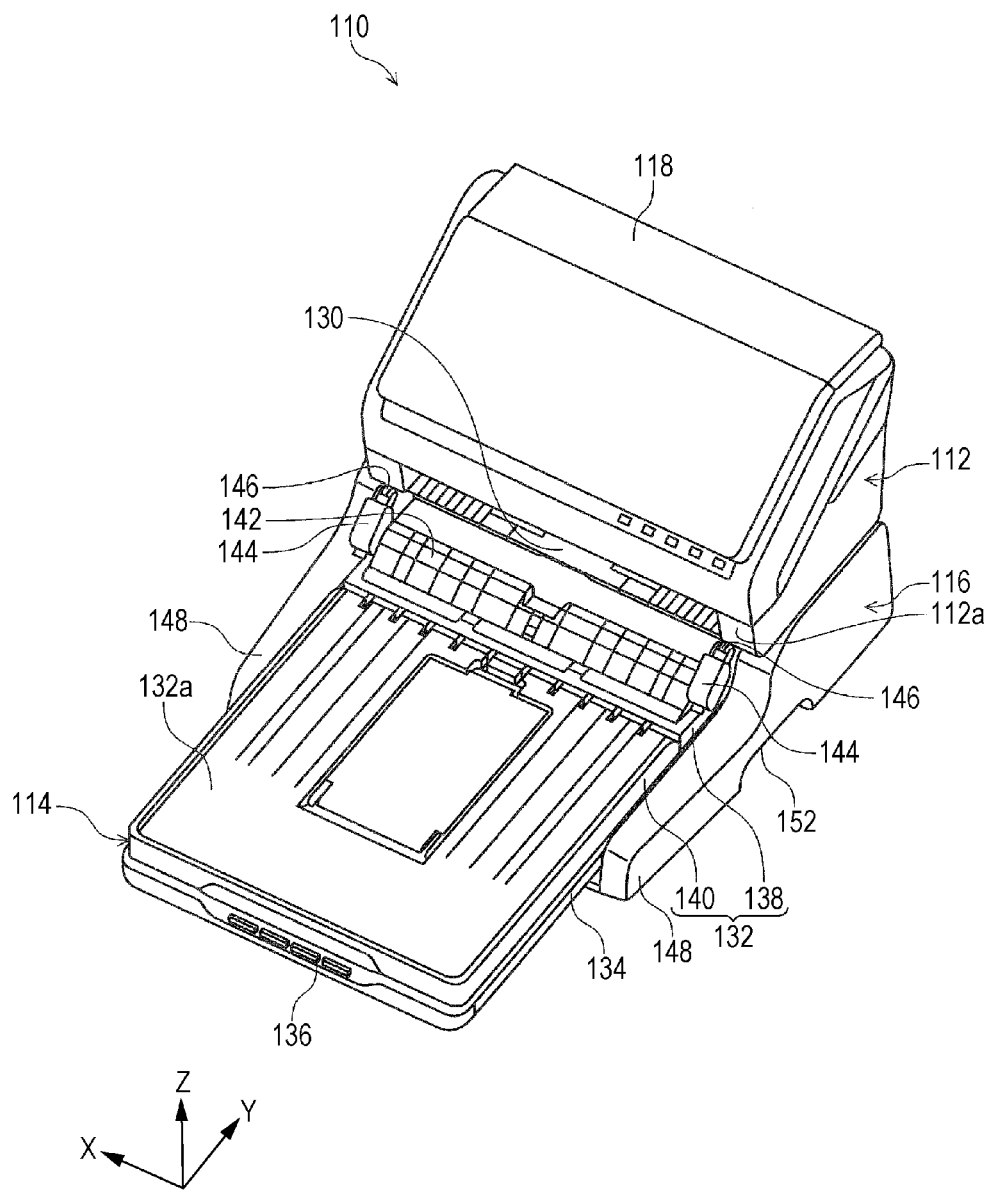
FIG. 10 is an external perspective view of an image reading system according to a second embodiment.
Figure 11:
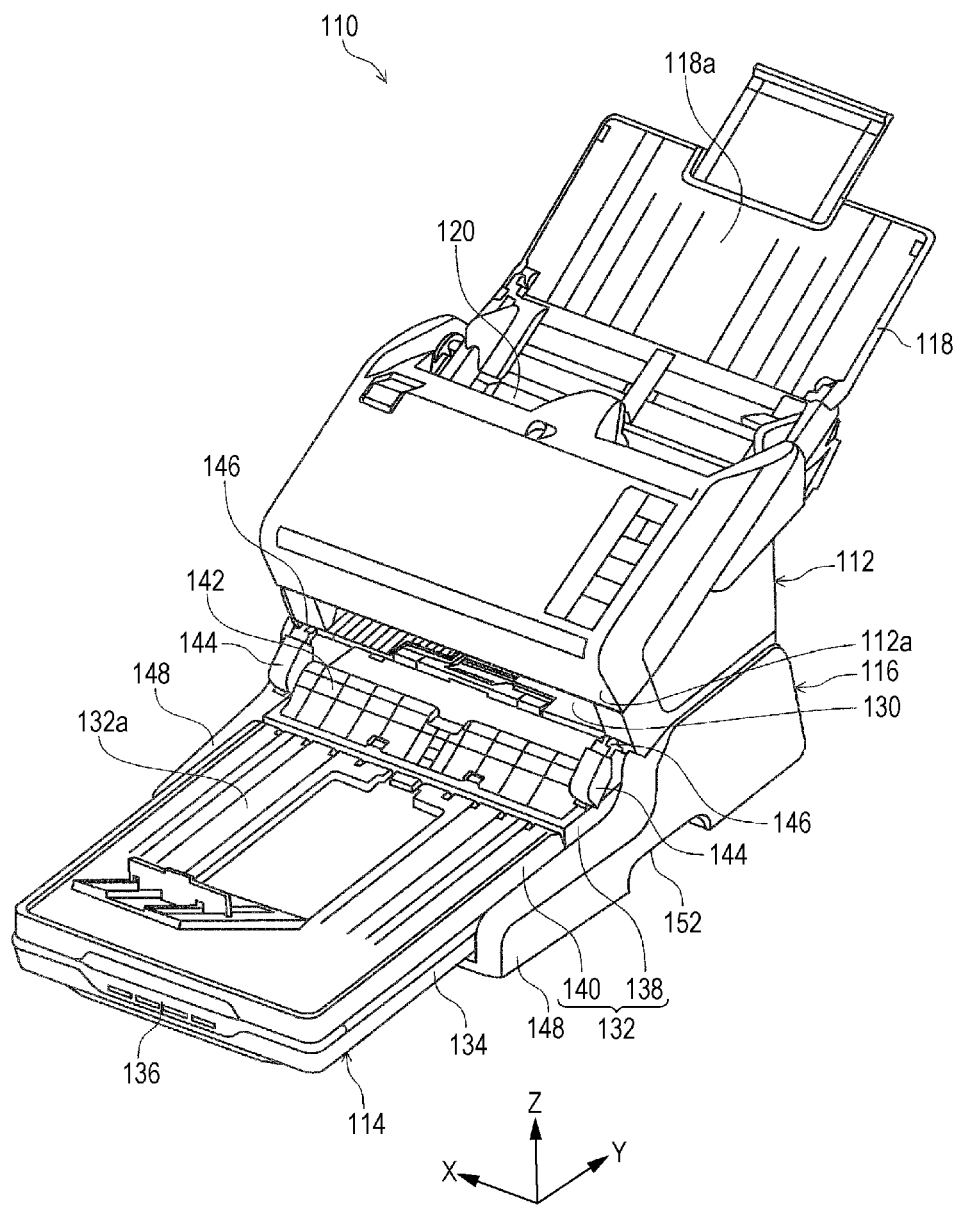
FIG. 11 is an external perspective view of the image reading system according to the second embodiment.
Figure 12:
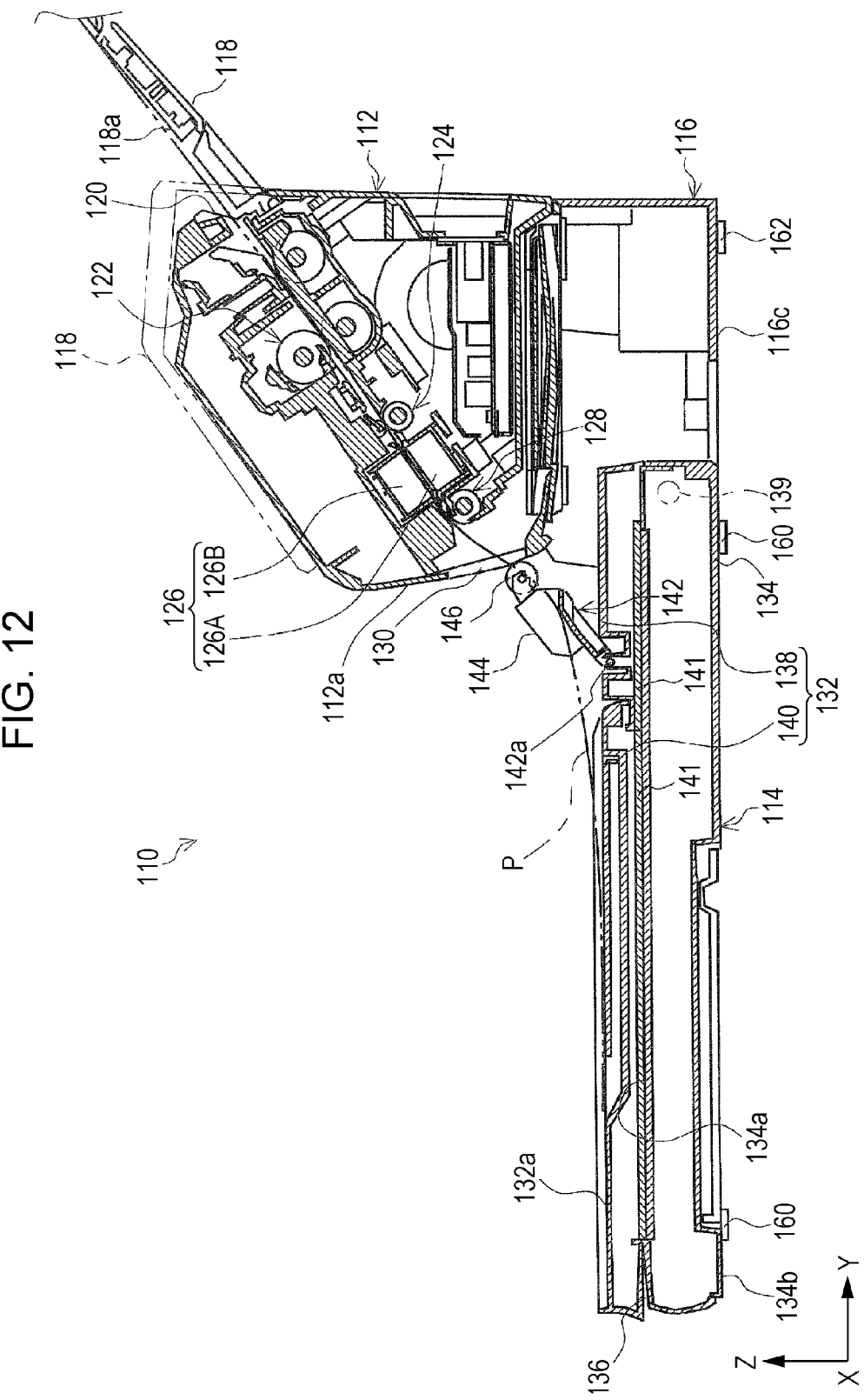
FIG. 12 is a side cross-sectional view which shows a medium transport path of a first image reading unit in the image reading system according to the second embodiment.
Figure 13:
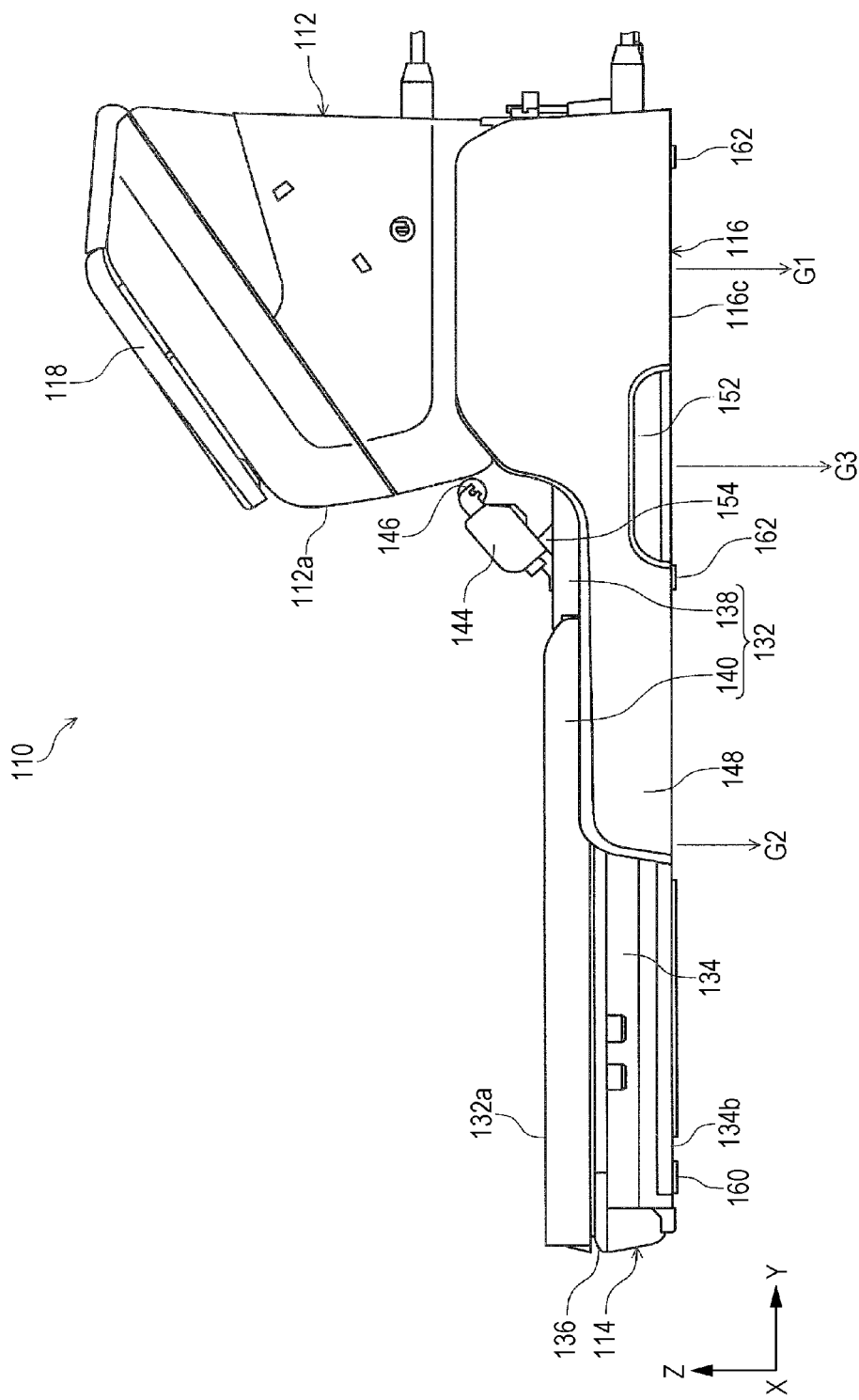
FIG. 13 is a side surface view of the image reading system according to the second embodiment.
Figure 14:
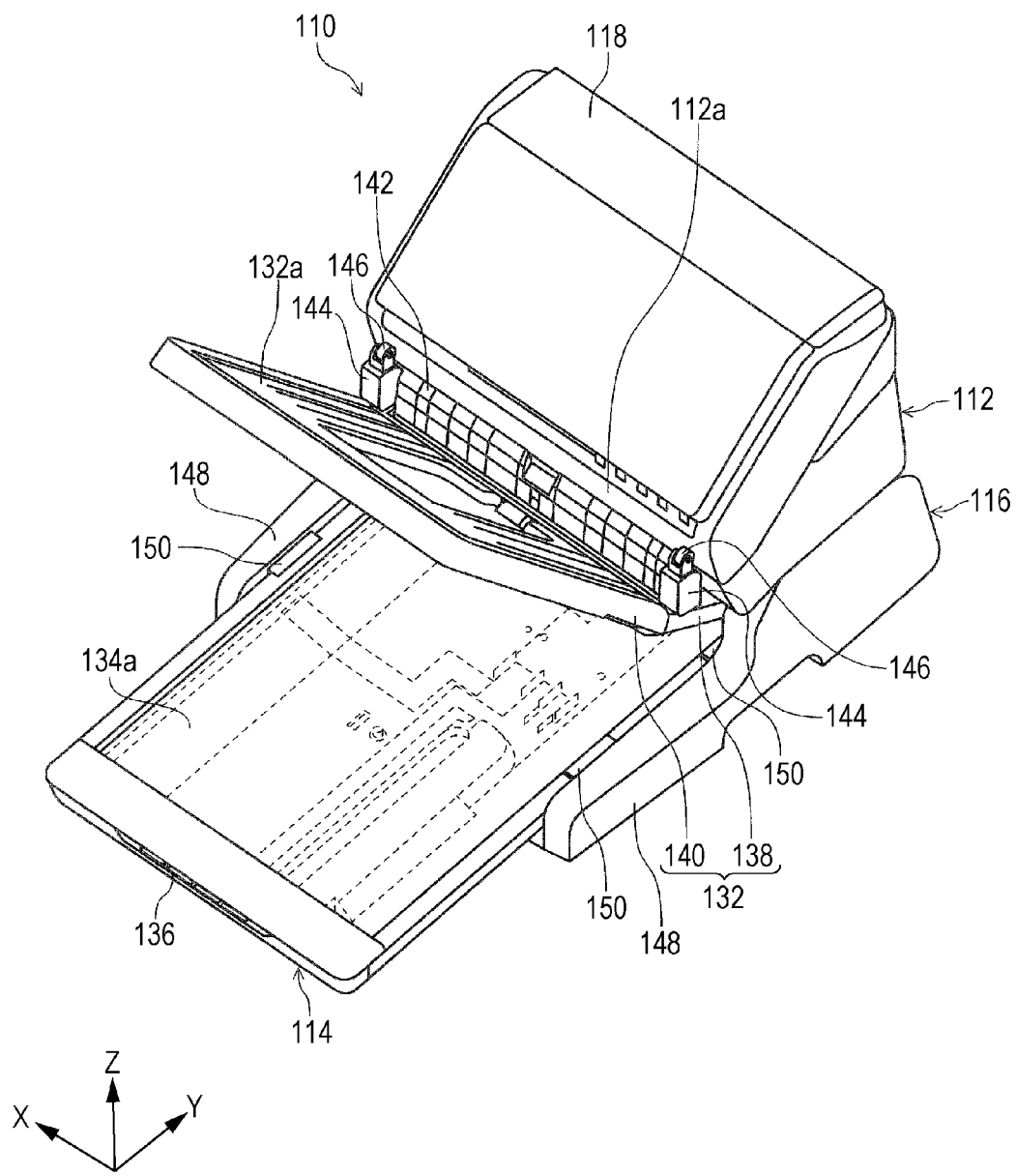
FIG. 14 is a perspective view which shows a state where the cover of the second image reading unit is open in the image reading system according to the second embodiment.
Figure 15:
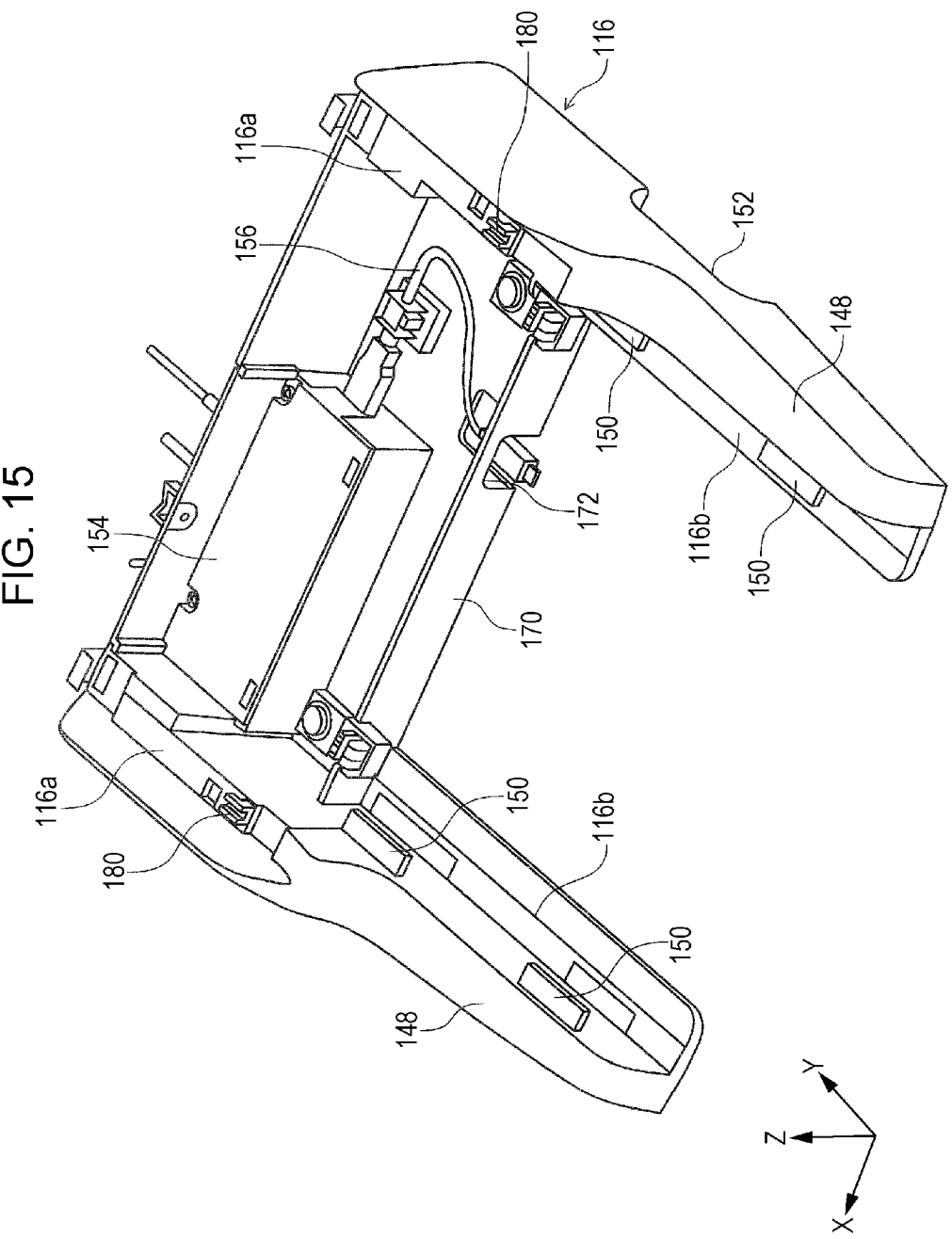
FIG. 15 is a perspective view of a connector of the image reading system according to the second embodiment.

FIG. 10 is an external perspective view of an image reading system according to a second embodiment, FIG. 11 is an external perspective view of the image reading system according to the second embodiment, FIG. 12 is a side cross-sectional view which shows a medium transport path of a first image reading unit in the image reading system according to the second embodiment, FIG. 13 is a side surface view of the image reading system according to the second embodiment, FIG. 14 is a perspective view which shows a state where a cover of a second image reading unit is open in the image reading system according to the second embodiment, and FIG. 15 is a perspective view of a connector of the image reading system according to the second embodiment.

Figure 16:
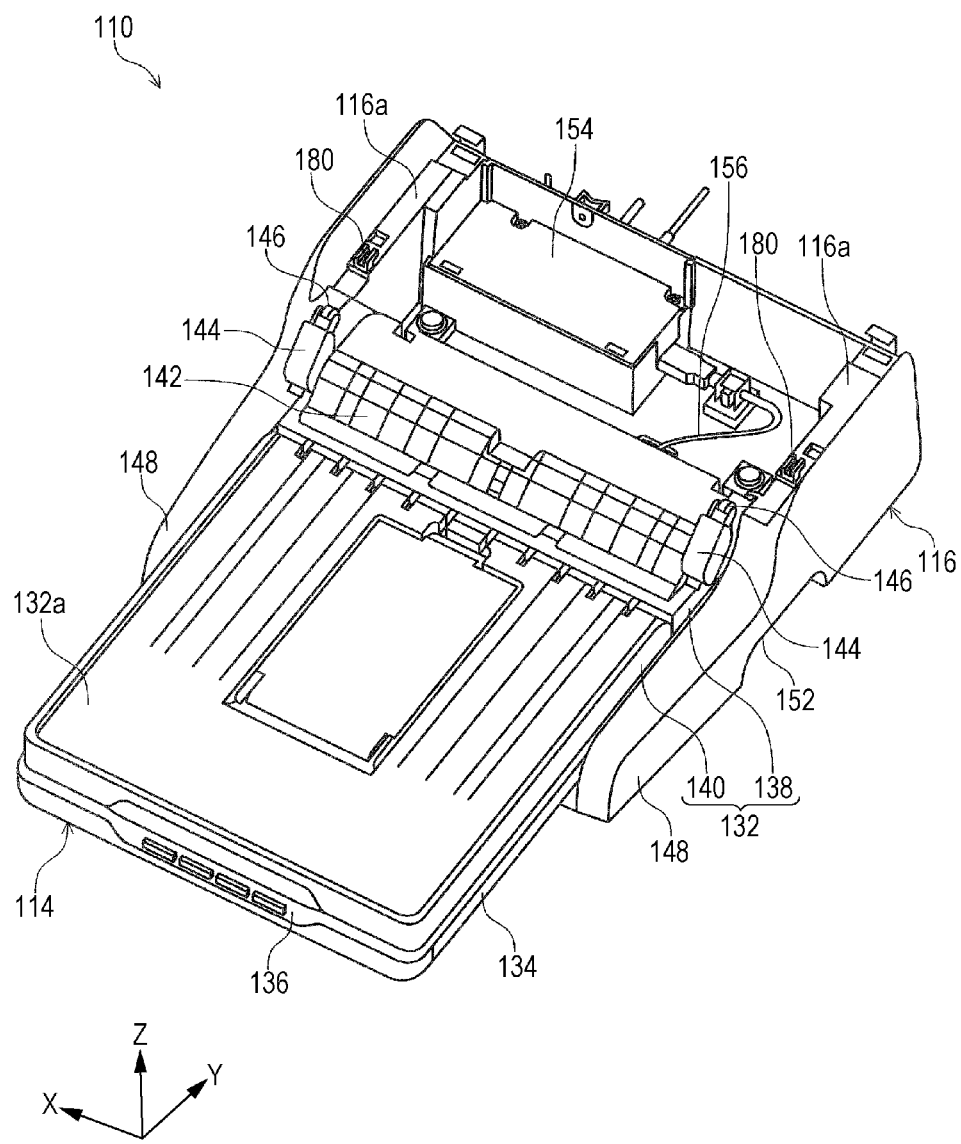
FIG. 16 is a perspective view which shows a state where the second image reading unit is connected to the connector according to the second embodiment.
Figure 17:
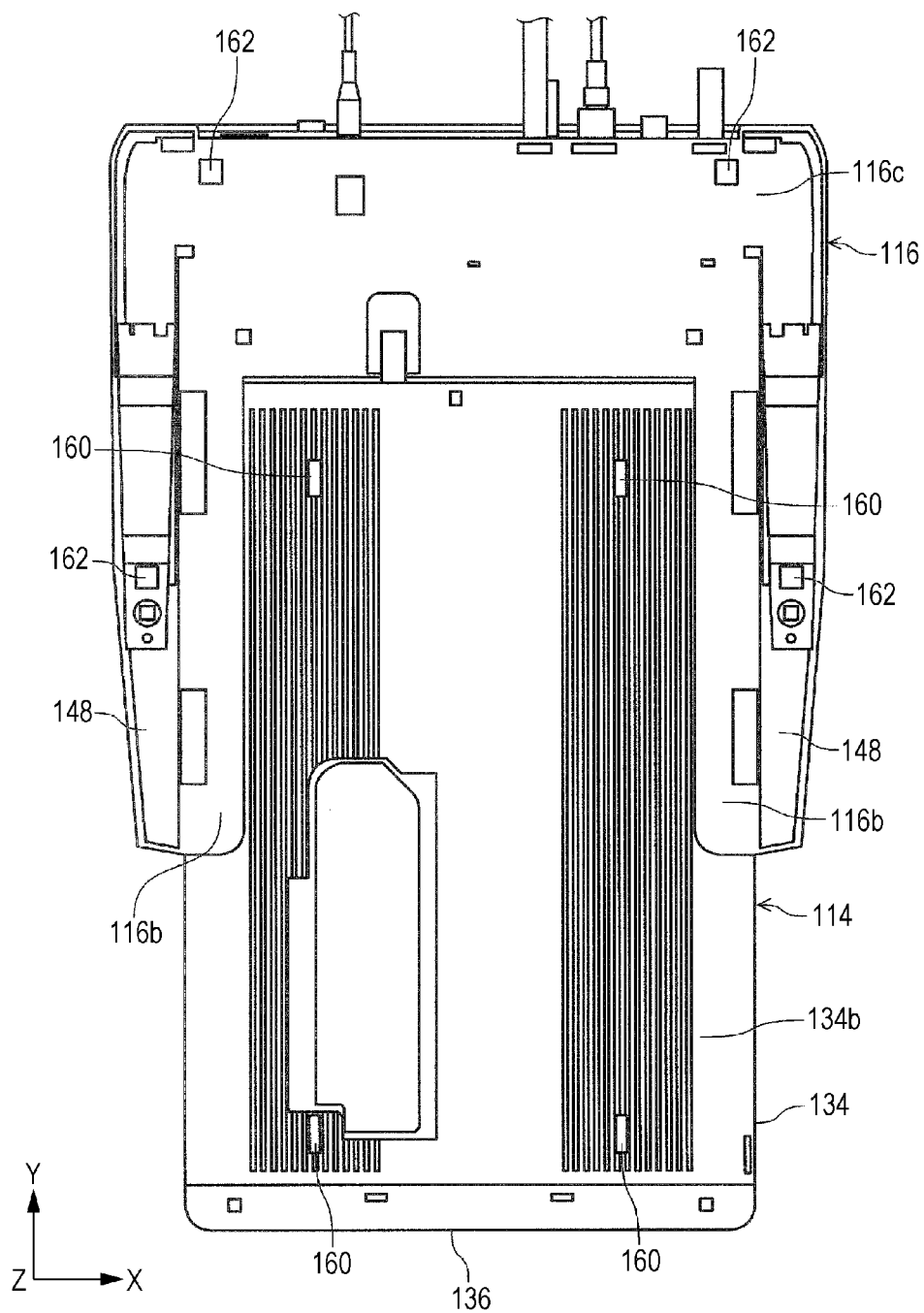
FIG. 17 is a plan view which shows a lower surface of the image reading system according to the second embodiment.
Figure 18:
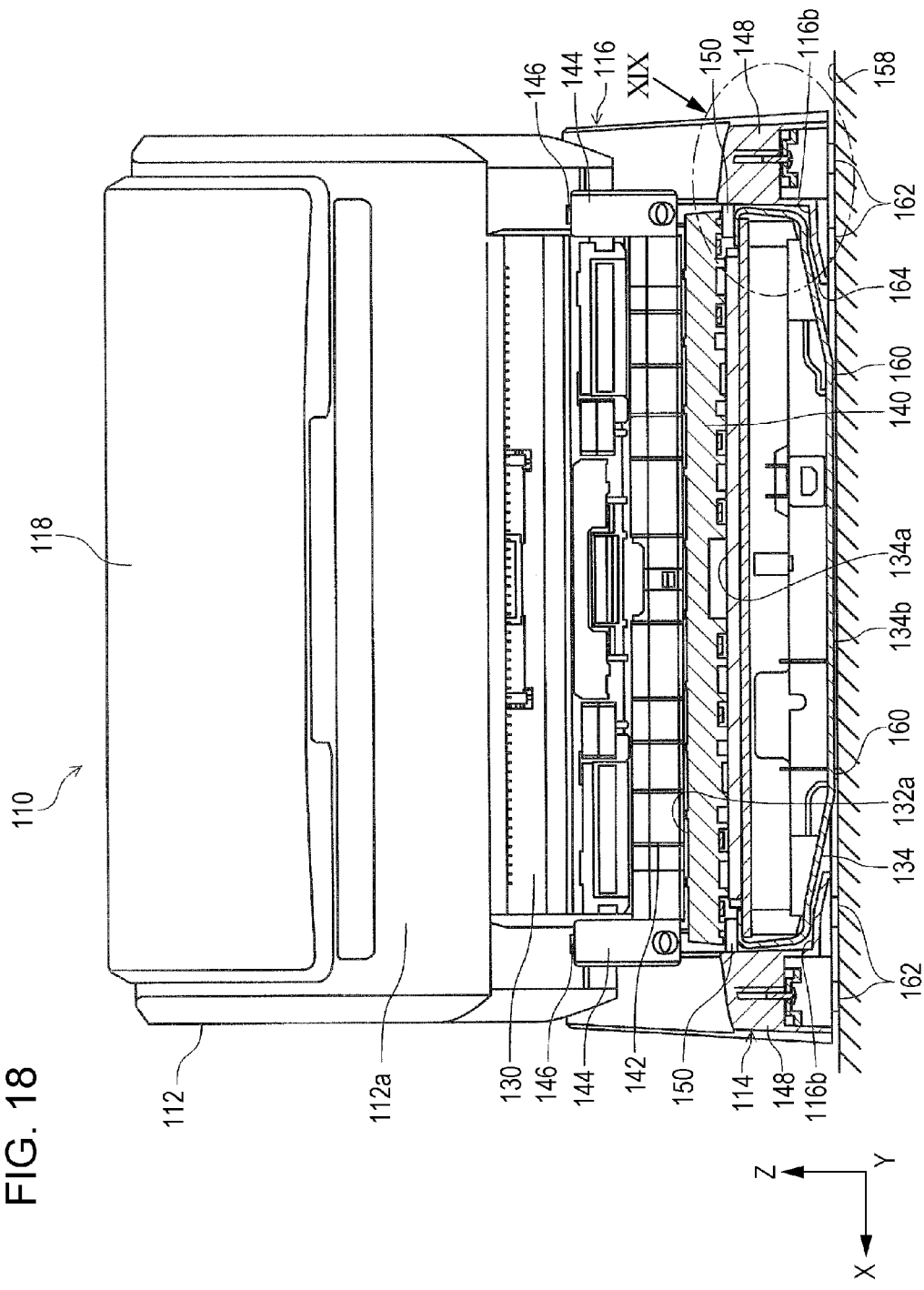
FIG. 18 is a cross-sectional view which shows the relationship between a pair of support sections of the connector and the second image reading unit according to the second embodiment.
Figure 19:
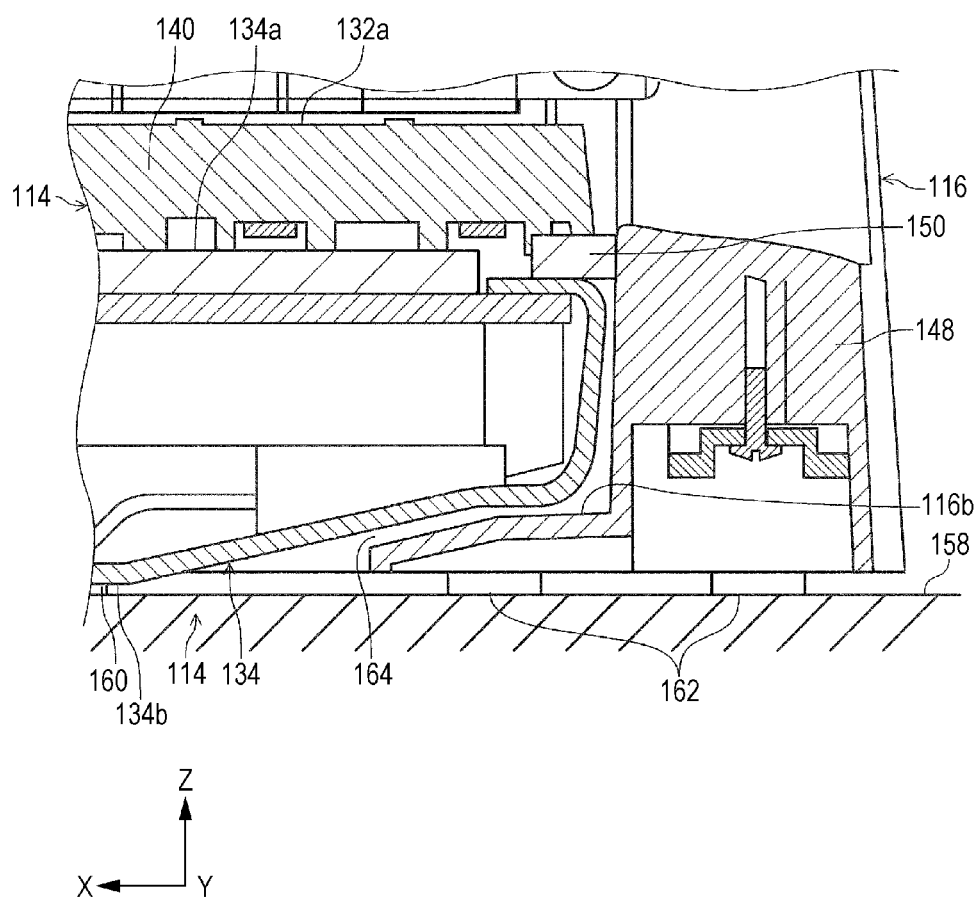
FIG. 19 is an enlarged cross-sectional view of one of the support sections and the second image reading unit in FIG. 18.
Figure 20:
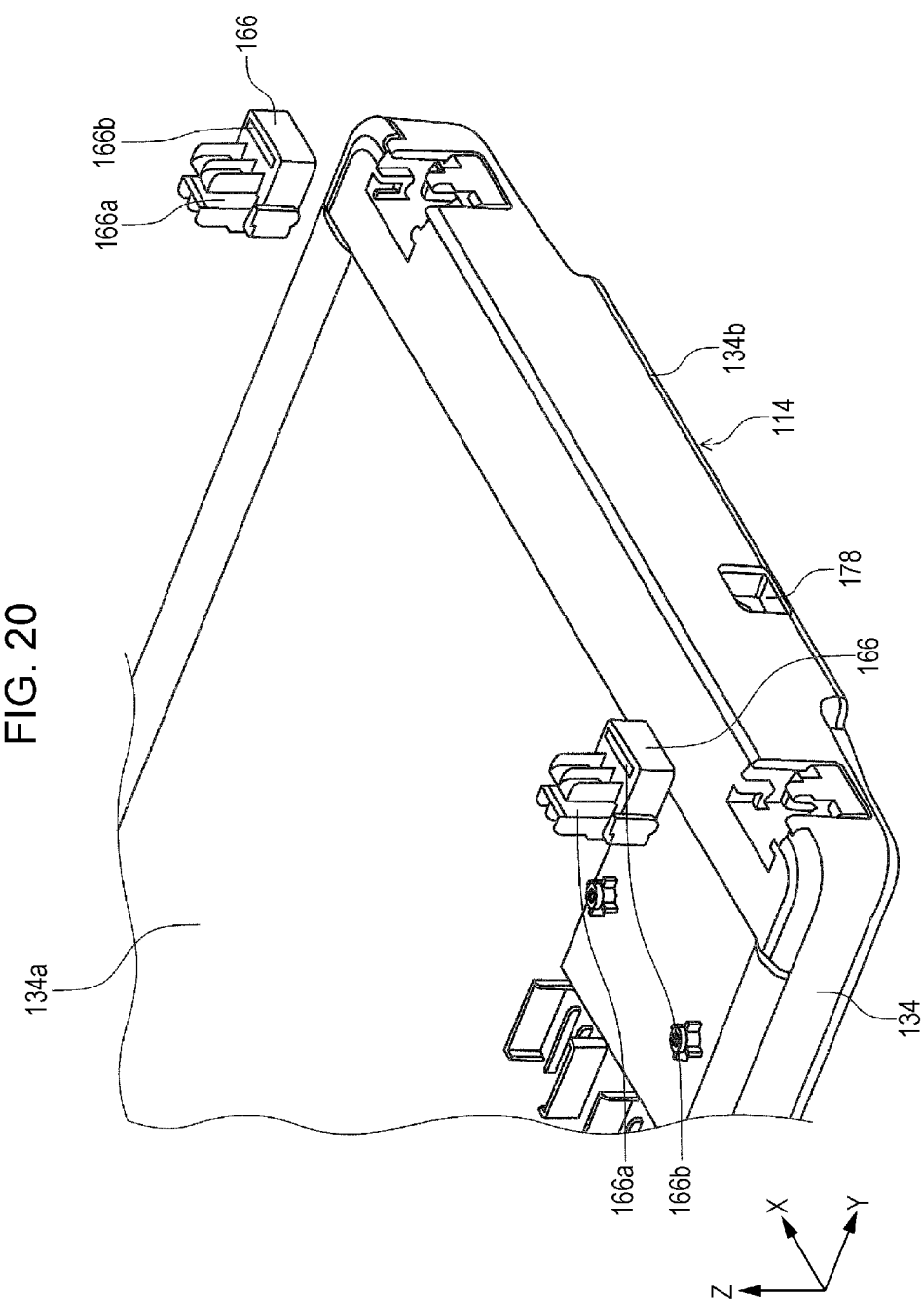
FIG. 20 is an explanatory view which shows a first state in the assembly of the image reading system according to the second embodiment.
Figure 21:
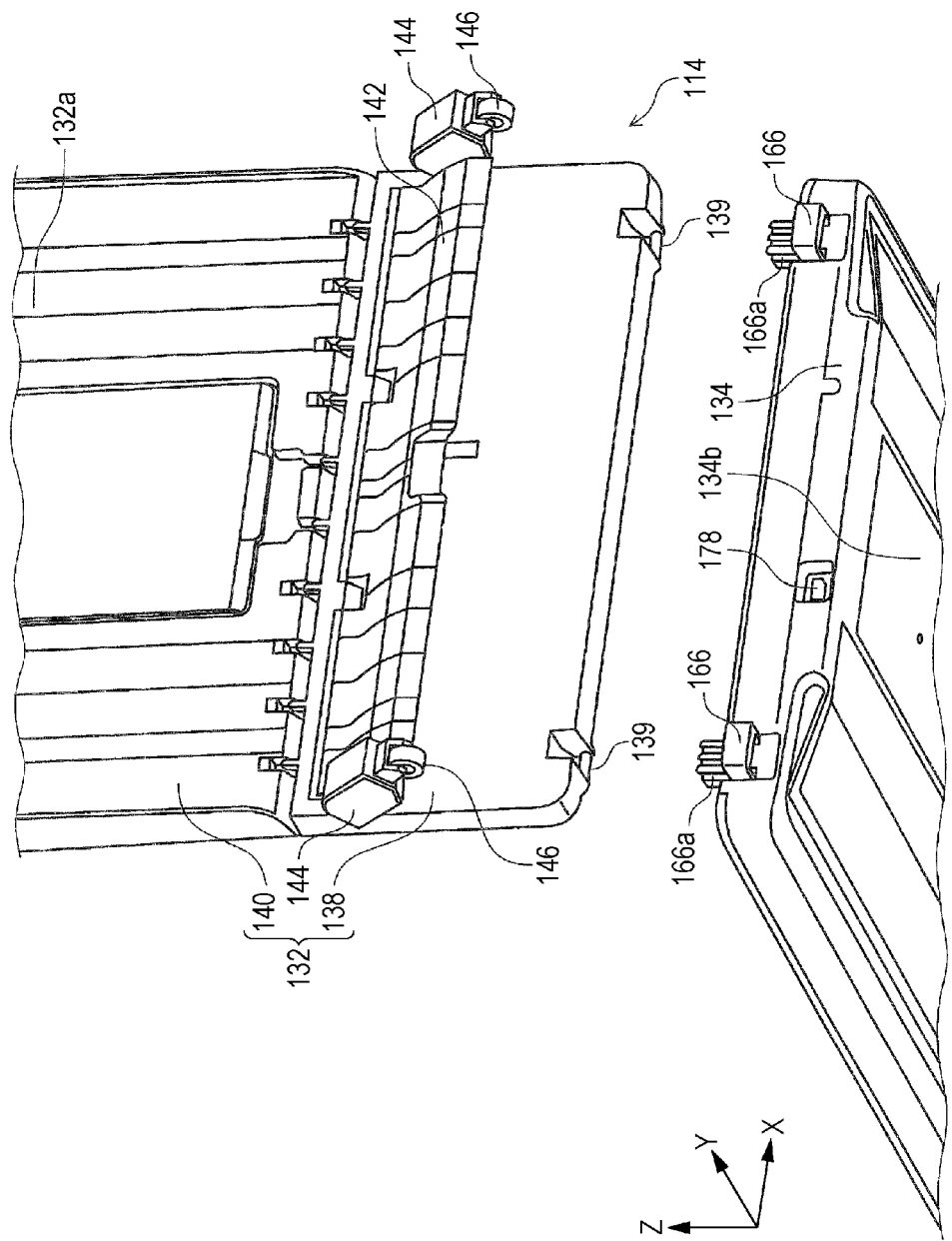
FIG. 21 is an explanatory view which shows a second state in the assembly of the image reading system according to the second embodiment.
Figure 22:
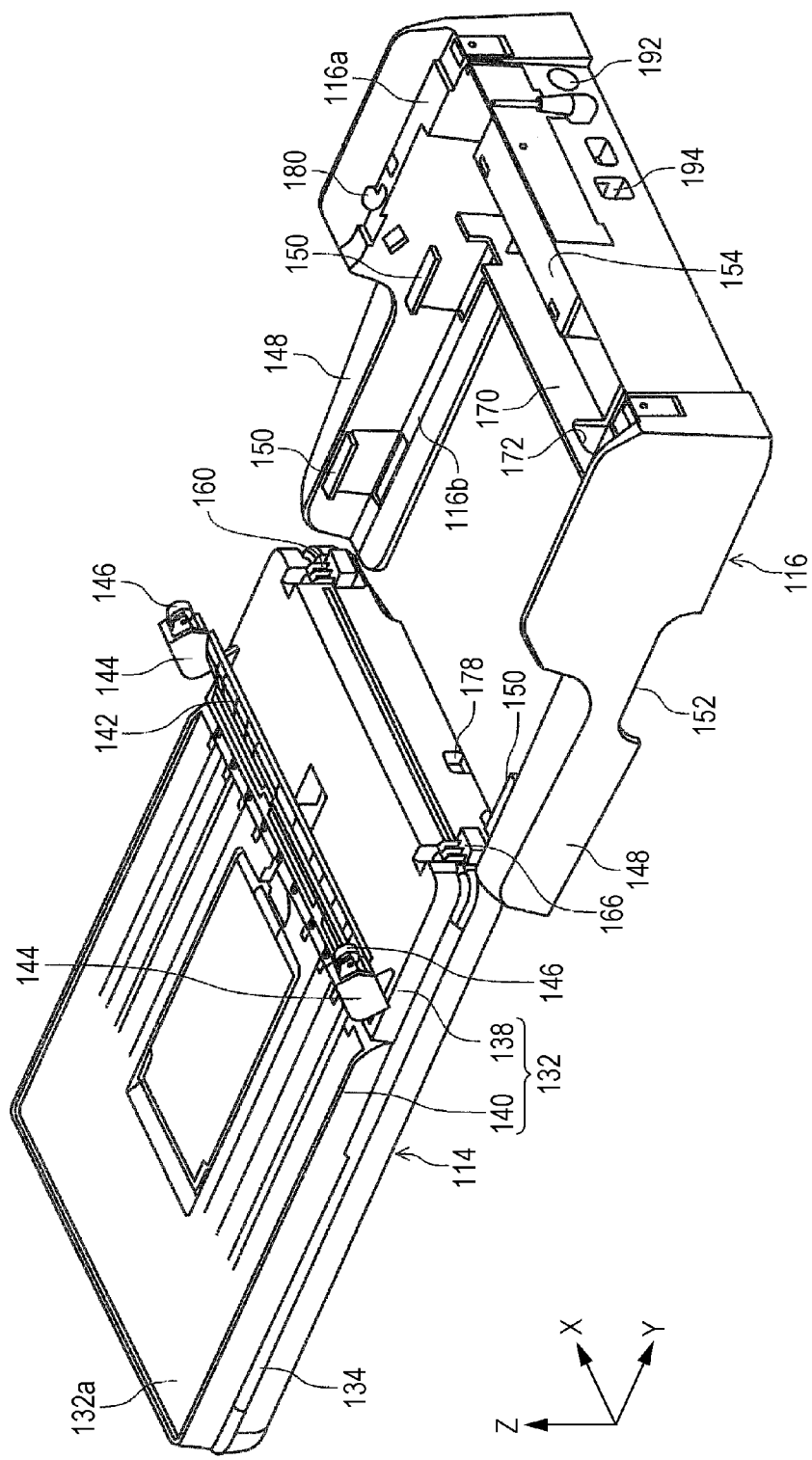
FIG. 22 is an explanatory view which shows a third state in the assembly of the image reading system according to the second embodiment.

In addition, FIG. 16 is a perspective view which shows a state where the second image reading unit is connected to the connector, FIG. 17 is a plan view which shows a lower surface of the image reading system according to the second embodiment, FIG. 18 is a cross-sectional view which shows a relationship between a pair of support sections of the connector and the second image reading unit, FIG. 19 is an enlarged cross-sectional view of one of the support sections and the second image reading unit in FIG. 18, FIG. 20 is an explanatory view which shows a first state in the assembly of the image reading system according to the second embodiment, FIG. 21 is an explanatory view which shows a second state in the assembly of the image reading system according to the second embodiment, and FIG. 22 is an explanatory view which shows a third state in the assembly of the image reading system according to the second embodiment.

Figure 23:
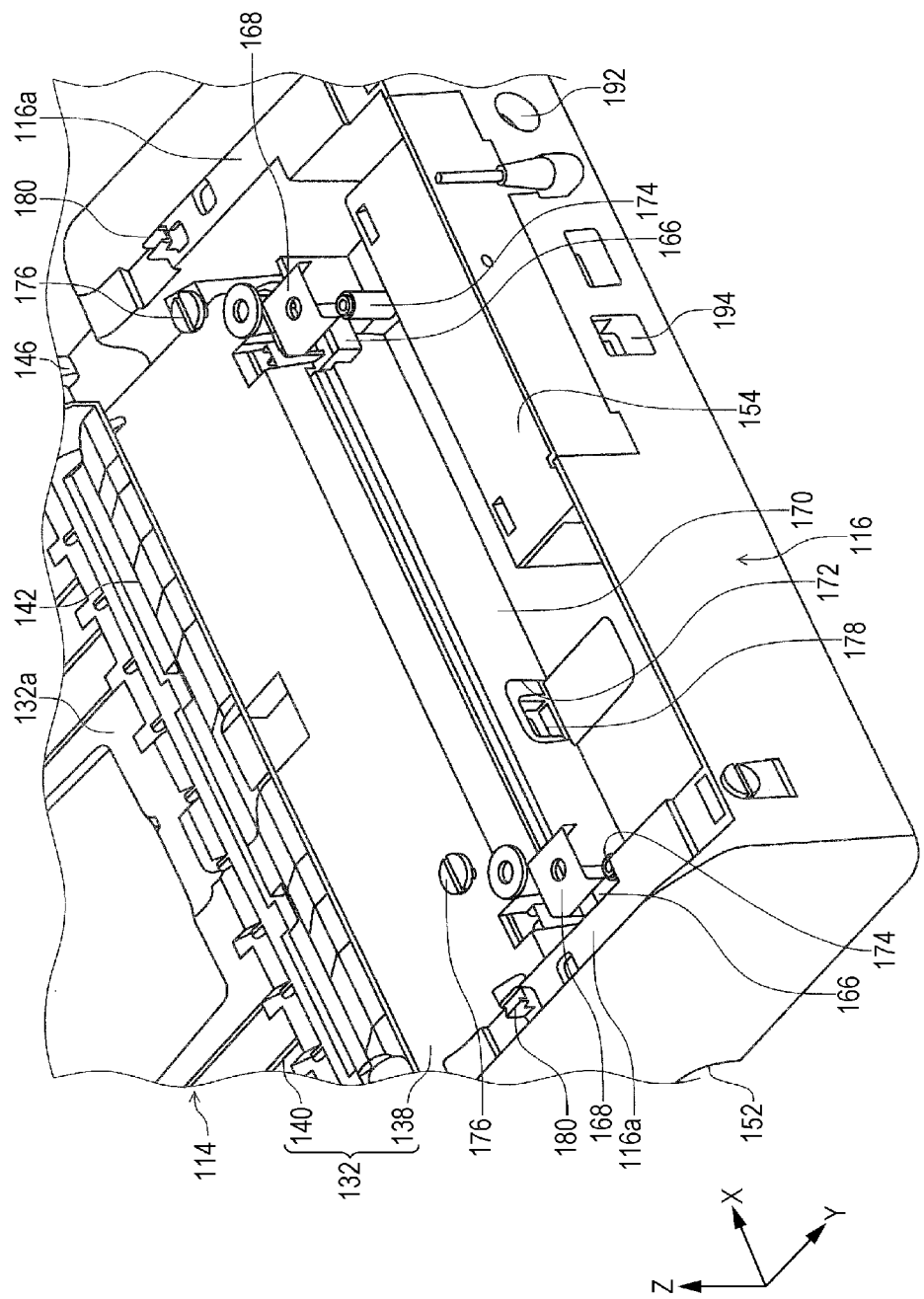
FIG. 23 is an explanatory view which shows a fourth state in the assembly of the image reading system according to the second embodiment.
Figure 24:
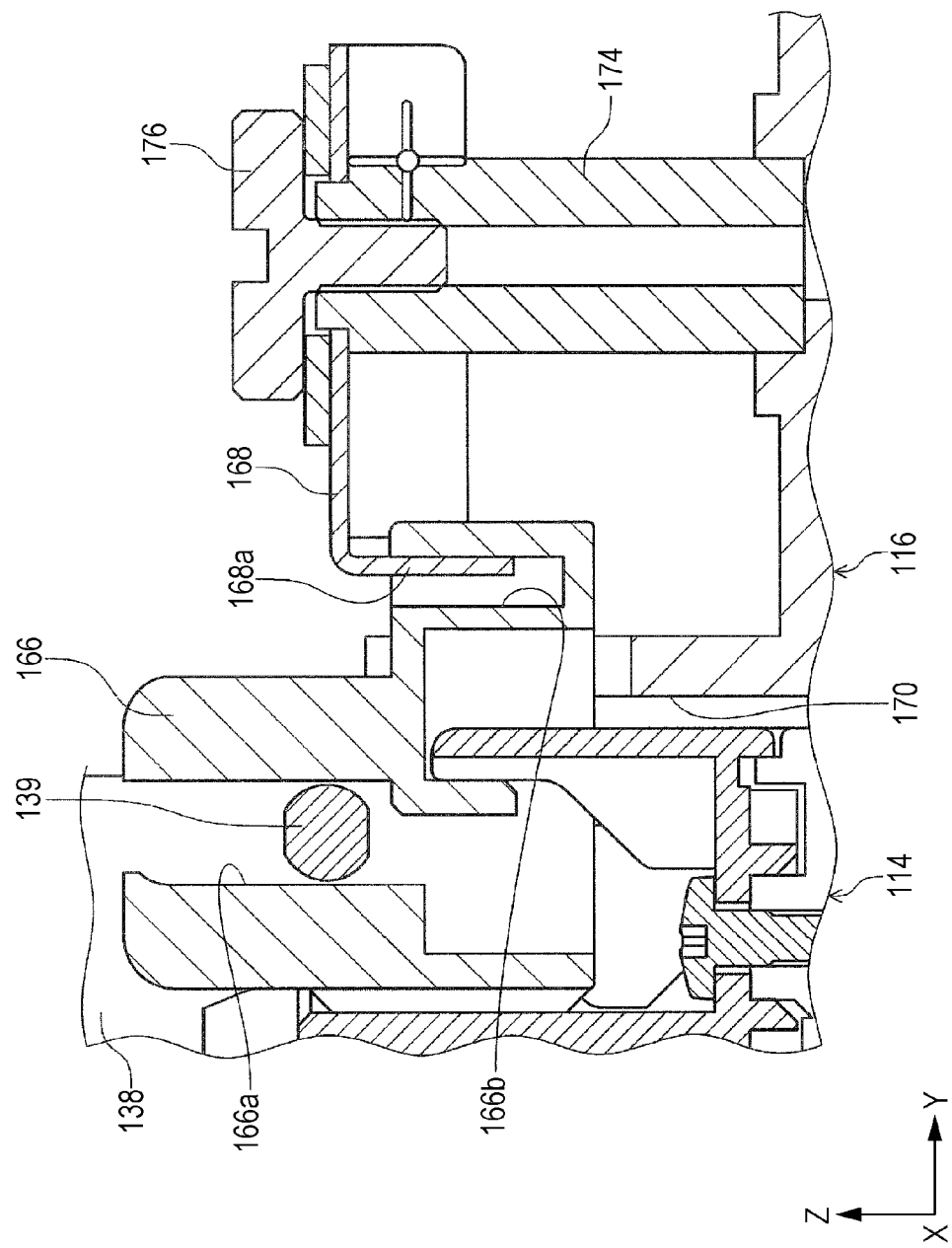
FIG. 24 is a side cross-sectional view which shows a joining section between the connector and the second image reading unit.
Figure 25:
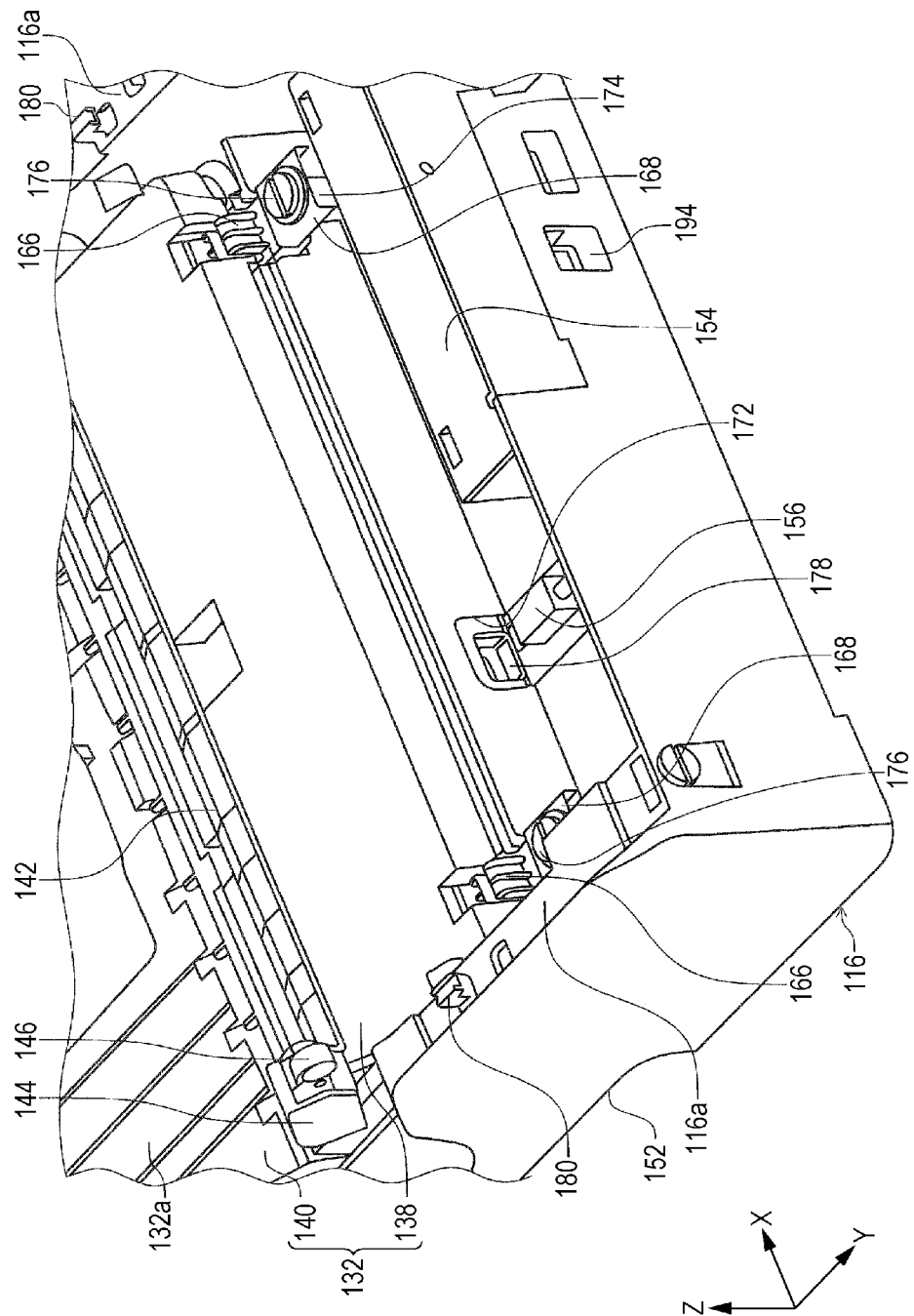
FIG. 25 is an explanatory view which shows a fifth state in the assembly of the image reading system according to the second embodiment.
Figure 26:
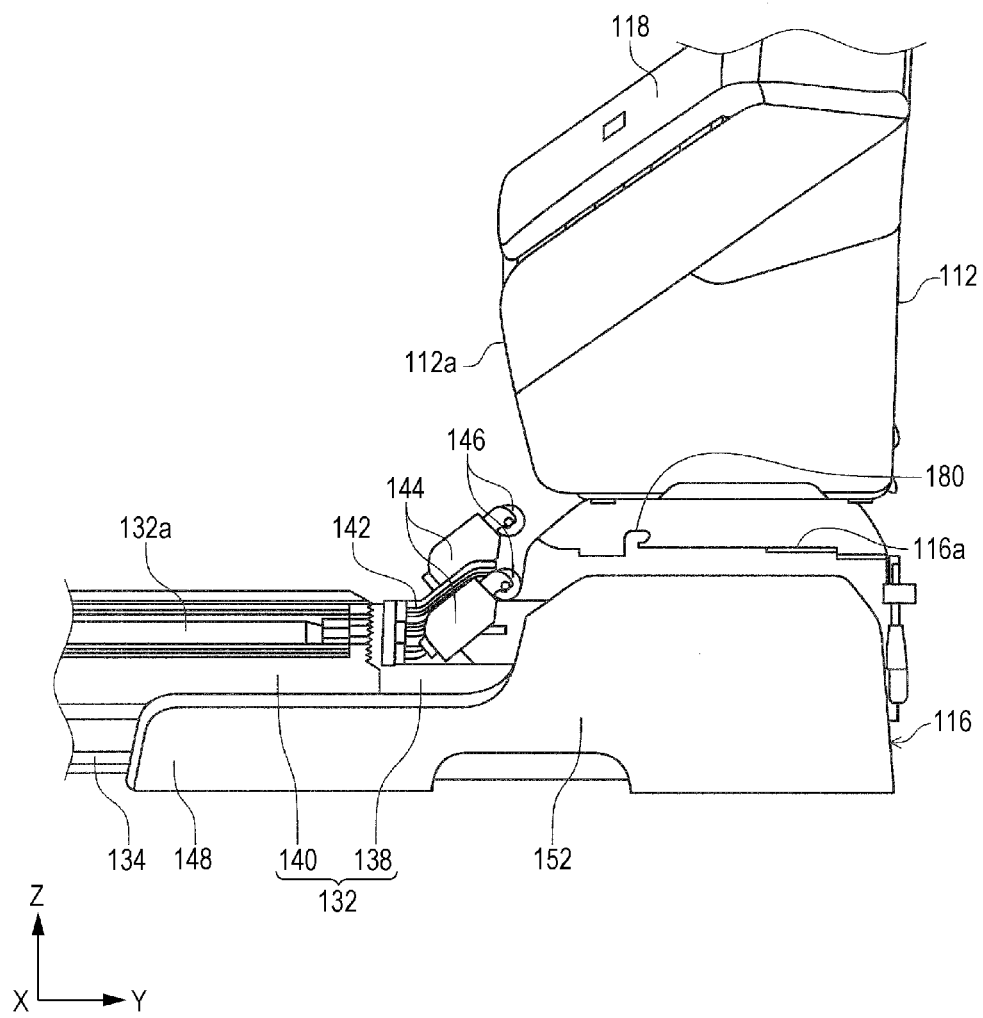
FIG. 26 is an explanatory view which shows a sixth state in the assembly of the image reading system according to the second embodiment.
Figure 27:
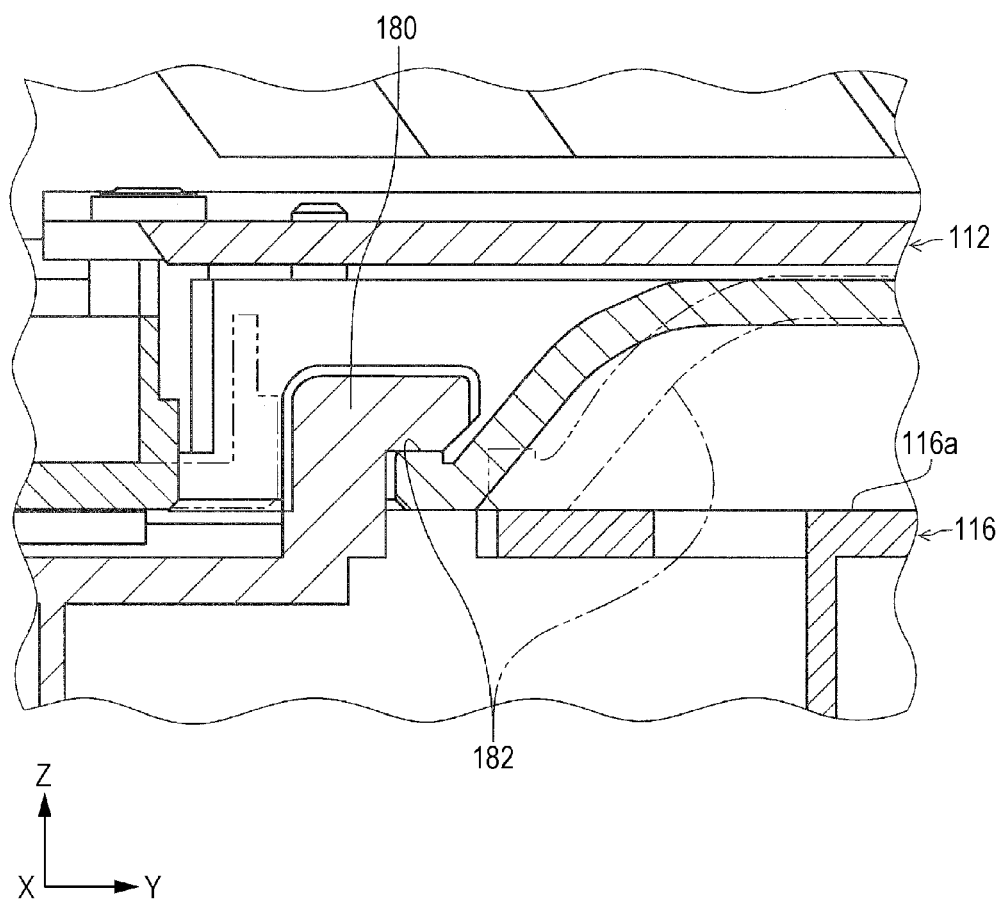
FIG. 27 is a side cross-sectional view which shows a joining section between the connector and the first image reading unit according to the second embodiment.
Figure 28:
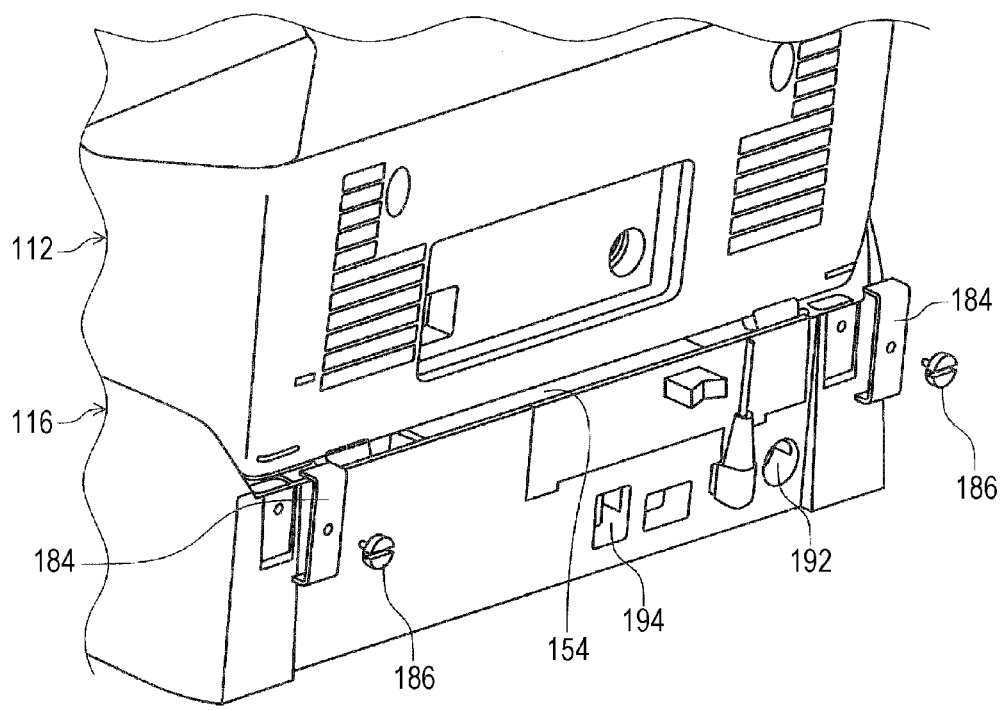
FIG. 28 is an explanatory view which shows a seventh state in the assembly of the image reading system according to the second embodiment.
Figure 29:
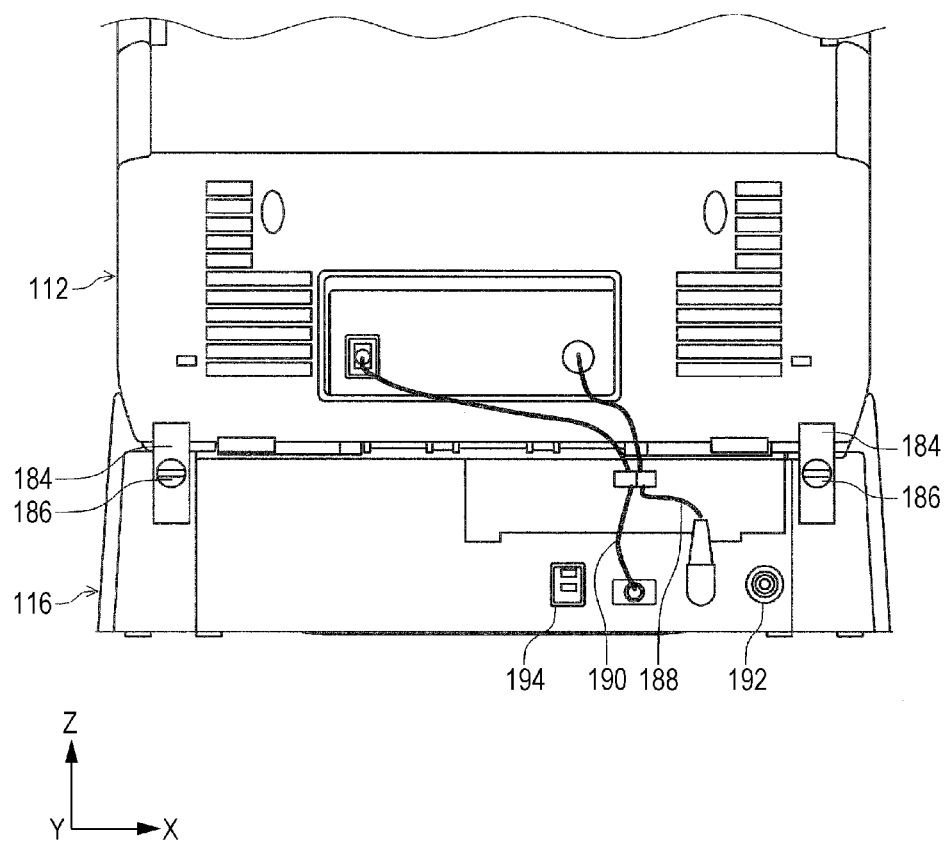
FIG. 29 is an explanatory view which shows an eighth state in the assembly of the image reading system according to the second embodiment.

In addition, FIG. 23 is an explanatory view which shows a fourth state in the assembly of the image reading system according to the second embodiment, FIG. 24 is a side cross-sectional view which shows a joining section between the connector and the second image reading unit, FIG. 25 is an explanatory view which shows a fifth state in the assembly of the image reading system according to the second embodiment, FIG. 26 is an explanatory view which shows a sixth state in the assembly of the image reading system according to the second embodiment, FIG. 27 is a side cross-sectional view which shows a joining section between the connector and the first image reading unit, FIG. 28 is an explanatory view which shows a seventh state in the assembly of the image reading system according to the second embodiment, and FIG. 29 is an explanatory view which shows an eighth state in the assembly of the image reading system according to the second embodiment.

In addition, regarding the X-Y-Z coordinate system which is shown in each diagram, the X direction indicates the paper width direction as well as the image reading system width direction, the Y direction indicates the image reading system depth direction, and the Z direction indicates the image reading system height direction. Here, in each diagram, the −Y direction is the image reading system front surface side and the +Y direction side is the image reading system rear surface side. In addition, in each diagram, the −Y direction is the medium transport direction in the first image reading unit.

Summary of Image Reading System

An image reading system 110 in the embodiment will be described with reference to FIG. 10 to FIG. 14. The image reading system 110 is provided with a first image reading unit 112, a second image reading unit 114, and a connector 116. In the embodiment, the first image reading unit 112 is connected to the upper section of the connector 116 so as to be able to be attached and detached and the second image reading unit 114 is connected to the front section of the connector 116 so as to be able to be attached and detached. Here, description will be given below of the attachment and the detachment of the first image reading unit 112 and the second image reading unit 114 to the connector 116.

In the embodiment, the first image reading unit 112 is configured as a sheetfed scanner and the second image reading unit 114 is configured as a flatbed scanner. Firstly, description will be given of a summary of the first image reading unit 112.

First Image Reading Unit

A medium support section 118 is provided in the upper section on the rear surface side of the first image reading unit 112. The medium support section 118 is attached so as to be able to rotate with respect to the first image reading unit 112. The medium support section 118 may be in a non-feeding state which covers the upper section of the first image reading unit 112 and the feeding opening 120 (refer to FIG. 11) as shown in FIG. 10 and a feeding state which opens the feeding opening 120 by rotating from the non-feeding state to the rear surface side of the first image reading unit 112 as shown in FIG. 11 and which allows a medium support surface 118a to support a medium P.

Here, to describe the transport path of the medium P with reference to FIG. 12, a pair of feeding rollers 122, a pair of transporting rollers 124, an image reading section 126, a pair of discharging rollers 128, and a discharge opening 130 are provided in order in the transport direction from the medium support surface 118a. A two-dot chain line with the reference sign P in FIG. 12 indicates the transport path of the medium P and the medium P which is supported by the medium support surface 118a is nipped by the pair of feeding rollers 122 and fed toward the pair of transporting rollers 124. Then, the pair of transporting rollers 124 nip and transport the medium P to the image reading section 126.

In the embodiment, the image reading section 126 is provided with an image reading sensors 126A and 126B. In the embodiment, the image reading sensor 126A is arranged facing the one surface (the surface on the lower side in the height direction) of the medium P so as to be able to read the one surface and the image reading sensor 126B is arranged facing the other surface (the surface on the upper side in the height direction) of the medium P so as to be able to read the other surface. Then, the image reading section 126 is configured so as to be able to read both surfaces of the medium P using the image reading sensors 126A and 126B. The medium P of which an image is read in the image reading section 126 is nipped by the pair of discharging rollers 128 and discharged toward a medium mounting section 132a of a cover section 132 of the second image reading unit 114 which is positioned in front of the first image reading unit 112 from the discharge opening 130 which is provided on the front surface of the first image reading unit 112.

Second Image Reading Unit

Subsequently, description will be given of a summary of the second image reading unit 114. The second image reading unit 114 is configured as a flatbed scanner. The second image reading unit 114 is provided with a housing 134 and a cover section 132 which is attached so as to be able to rotate with respect to the housing 134. A rectangular medium reading surface 134a (refer to FIG. 12 and FIG. 14) is provided in the upper section of the housing 134. In the embodiment, the medium reading surface 134a is configured by a flat and transparent glass plate and it is possible to mount the medium P which reads an image on the upper surface thereof.

In addition, although not shown in the diagram, image reading means is provided in the housing 134. In the embodiment, the image reading means is configured so as to be able to read a surface which faces the medium reading surface 134a of the medium P which is mounted on the medium reading surface 134a by moving in the longitudinal direction or the lateral direction of the medium reading surface 134a on the lower side of the medium reading surface 134a.

In addition, an operating section 136 is provided on the apparatus front surface side (the −Y axis direction side in FIG. 10 and FIG. 11) in the housing 134. The operating section 136 is configured to be provided with a power switch, a setting switching button, and the like for operating the second image reading unit 114.

With reference to FIG. 11 and FIG. 14, in the embodiment, the cover section 132 is attached to the housing 134 so as to be able to switch between a closed position (refer to FIG. 11) covering the medium reading surface 134a and an opened position (refer to FIG. 14) for exposing the medium reading surface 134a. In detail, the cover section 132 is configured so as to be able to rotate with respect to the housing 134. In addition, in the embodiment, the cover section 132 is provided with a first member 138 and a second member 140.

In the embodiment, a rotation shaft 139 (refer to FIG. 12 and FIG. 21) is provided at an end section on the rear surface side in the depth direction of the first member 138. The first member 138 is attached to the end section on the rear surface side in the depth direction of the housing 134 so as to be able to rotate with respect to the housing 134 with the rotation shaft 139 as a supporting point. In addition, the second member 140 is linked to the end section on the front surface side in the depth direction of the first member 138 so as to be able to rotate with respect to the first member 138. Here, in the embodiment, the rotation shaft 139 is configured so as to be able to be displaced in the height direction with respect to the housing 134. Accordingly, it is possible to separate the cover section 132 upward in the height direction from the medium reading surface 134a while maintaining the closed position covering the medium reading surface 134a. That is, even in a state where a medium P which is comparatively thick is mounted on the medium reading surface 134a, the cover section 132 is configured to be able to press the medium P.

Medium pressing members 141 are respectively provided on the lower surfaces of the first member 138 and the second member 140, that is, the surfaces which face the medium reading surface 134a. The medium pressing member 141 is configured by an elastic member such as a sponge.

When the cover section 132 is in a closed position (refer to FIG. 12) with respect to the housing 134, the medium pressing member 141 uniformly presses the medium P which is mounted on the medium reading surface 134a which is provided in the housing 134 from the opposite side of the target reading surface of the medium P. Due to this, the target reading surface of the medium which is pressed by the medium pressing member 141 is adhered to the medium reading surface 134a. That is, the medium pressing member 141 is able to prevent the medium P from rising from the medium reading surface 134a. Here, the size of the medium pressing member 141 is set to substantially the same size as the size of the medium reading surface 134a so as to be able to press the entire region of the surface on the opposite side of the medium reading surface 134a in the medium P which is mounted on the medium reading surface 134a.

In addition, the upper surface of the second member 140 is configured as the medium mounting section 132a for mounting the medium P which is discharged from the first image reading unit 112.

In addition, a slope member 142 is attached to the upper surface of the first member 138 so as to be able to rotate with respect to the first member 138. In the embodiment, the slope member 142 functions as a guide member for guiding the medium P which is discharged from the discharge opening 130 of the first image reading unit 112 to the medium mounting section 132a of the second image reading unit 114. The slope member 142 extends in the width direction and engaging sections 144 are provided at both ends thereof. The engaging sections 144 are provided at positions separated in the width direction from a region through which the medium P which is discharged from the discharge opening 130 of the first image reading unit 112 passes. In addition, a roller member 146 (a contact section) which is able to freely rotate is provided at the front end of the engaging section 144.

Here, the roller member 146 comes into contact with a front surface 112a of the first image reading unit 112 in a state where the first image reading unit 112 and the second image reading unit 114 are mounted on the connector 116.

In addition, in the embodiment, the rotation shaft 139 (refer to FIG. 12) is provided on the front surface side in the depth direction of the slope member 142. The slope member 142 is attached so as to be able to rotate with respect to the first member 138 with the rotation shaft 139 as a supporting point. In the embodiment, the slope member 142 is able to be switched from a guide position (refer to FIG. 11) for guiding the medium P which is discharged from the discharge opening 130 of the first image reading unit 112 to the medium mounting section 132a of the second image reading unit 114 to a position (refer to FIG. 14) which is retracted from the transport path of the medium P which is discharged from the first image reading unit 112 by rotating the slope member 142 in the counterclockwise direction in FIG. 11 and FIG. 14.

Here, the slope member 142 is biased to the first image reading unit 112 side by the biasing means which is not shown in the diagram, that is, to take the guide position. In addition, when switching the position of the slope member 142 from a guide position to a retracted position, the roller member 146 is displaced from the lower side to the upper side of the front surface 112a while maintaining the state of contact with the front surface 112a of the first image reading unit 112.

Connector

Description will be given of the connector 116 with reference to FIG. 15. As shown in FIG. 15, the connector 116 is provided with a first attaching section 116a for attaching the first image reading unit 112 and a second attaching section 116b for attaching the second image reading unit 114. In the embodiment, the rear surface side of connector 116 is raised in the height direction with respect to the front surface side in the depth direction. The first attaching section 116a is provided in the raised portion, that is, the upper section of the connector 116. Then, the first attaching section 116a functions as a first support surface which is able to support the first image reading unit 112 when mounting the first image reading unit 112 on the upper section of the connector 116.

Here, when referring to FIG. 13, in the embodiment, the first image reading unit 112 is mounted on the upper section of the connector 116 and the first attaching section 116a supports the first image reading unit 112. Then, the first attaching section 116a supports a region with a length of ½ or more of the bottom surface of the first image reading unit 112 in a predetermined direction, that is, in the depth direction.

In addition, in FIG. 15, support sections 148 in the form of a pair of arms which extend to the front surface side and which face each other at an interval in the width direction are formed on the front surface side of the connector 116. Then, the second attaching section 116b is provided in the support sections 148. When the second attaching section 116b is mounted from the side of the connector 116, the front side in the embodiment, the second attaching section 116b functions as a second support surface which is able to support the second image reading unit 114. In addition, at least one eaves section 150 which is positioned above the second attaching section 116b and which faces the second attaching section 116b is formed in the support sections 148. Here, in the embodiment, the distance between the second attaching section 116b and the eaves section 150 in the height direction is set to be larger than the dimensions of the second image reading unit 114 in the height direction of the housing 134.

When referring to FIG. 14 and FIG. 16, in the embodiment, the second image reading unit 114 is arranged between the support sections 148 in the form of a pair of arms. In more detail, the second image reading unit 114 is inserted between the second attaching section 116b and the eaves section 150 in the height direction from the front side of the connector 116 and is mounted on the connector 116. Then, the second attaching section 116b as the second support surface is able to support a region with a length of ½ or more of the bottom surface of the second image reading unit 114 in a predetermined direction, that is, in the depth direction.

In addition, in the embodiment, since the first attaching section 116a supports a region with a length of ½ or more in the depth direction in the bottom surface of the first image reading unit 112, the first attaching section 116a is able to receive most of the weight of the first image reading unit 112.

In addition, in the same manner, in the embodiment, since the second attaching section 116b is able to support a region with a length of ½ or more in the depth direction in the bottom surface of the second image reading unit 114, the second attaching section 116b is able to receive most of the weight of the second image reading unit 114.

In addition, as shown in FIG. 13, in a state where the first image reading unit 112 and the second image reading unit 114 are mounted on the connector 116, a center position G3 in the depth direction of the connector 116 is positioned between a center position G1 of the first image reading unit 112 and a center position G2 of the second image reading unit 114 in the depth direction.

Here, as shown in FIG. 13 and FIG. 15, a handle section 152 is provided at a position which corresponds to the center position G3 in the depth direction in the connector 116. Accordingly, when lifting the image reading system 110, it is possible to lift the image reading system 110 in a well-balanced manner and it is possible to stably carry the image reading system 110.

In addition, the connector 116 is provided with a relay section 154. In the embodiment, the relay section 154 is arranged below the rear surface side of the connector 116. The relay section 154 has a circuit board which is not shown in the diagram and a signal line cable terminal or a power supply cable terminal are able to be attached to and detached from the circuit board via a plurality of openings (refer to FIG. 28 and FIG. 29) which are provided on the rear surface of the connector 116. In addition, in the connector 116, a signal line cable 156 extends from the circuit board. As shown in FIG. 16, one end of the signal line cable 156 is connected to the circuit board (which is not shown in the diagram) of the relay section 154 and the other end is connected to the second image reading unit 114 which is in a state of being mounted on the connector 116. In the embodiment, the signal line cable 156 not only sends and receives data between the relay section 154 and the second image reading unit 114, but also supplies power from the relay section 154 to the second image reading unit 114. Here, in the embodiment, as an example, the signal line cable 156 is configured as a USB cable.

Here, description will be given of the mounted state of the second image reading unit 114 and the connector 116 with reference to FIG. 17 to FIG. 19. As shown in FIG. 17, on a bottom surface 134b of the housing 134 of the second image reading unit 114, a plurality of foot sections 160 which support the second image reading unit 114 when installing the second image reading unit 114 on an installation surface 158 such as a desk are provided. In the embodiment, as an example, the foot sections 160 are provided at four places on the bottom surface 134b. Here, in the embodiment, the foot sections 160 are configured as rubber feet as an example.

In addition, on a bottom surface 116c of the connector 116, a plurality of foot sections 162 which support the connector 116 when installing the connector 116 on the installation surface 158 such as a desk are provided. In the embodiment, as an example, the foot sections 162 are provided at four places on the bottom surface 116c. Here, in the embodiment, the foot sections 162 are also configured as rubber feet in the same manner as the foot sections 160.

As shown in FIG. 18 and FIG. 19, when installing the connector 116, on which the first image reading unit 112 and the second image reading unit 114 are mounted, on the installation surface 158, the first image reading unit 112 and the connector 116 are supported by the foot sections 162. On the other hand, the second image reading unit 114 is supported by the foot sections 160 and stands alone. In this state, the eaves section 150 of the connector 116 regulates the upward displacement of the second image reading unit 114 in the height direction with respect to the connector 116.

In addition, in this state, the second attaching section 116b of the connector 116 and the bottom section of the second image reading unit 114 are in a separated state (refer to FIG. 19). That is, a gap 164 is formed between the second attaching section 116b and the bottom section of the second image reading unit 114. Here, FIG. 19 shows an enlarged region which is surrounded by a one-dot chain line in FIG. 18.

In addition, when lifting the image reading system 110 from the installation surface 158 in a state where the first image reading unit 112 and the second image reading unit 114 are mounted on the connector 116, the second image reading unit 114 is displaced downward by the weight of the second image reading unit 114 and the second attaching section 116b and the bottom section of the second image reading unit 114 come into contact. That is, the gap 164 disappears and the second image reading unit 114 is in a state of being supported by the second attaching section 116b.

Image Reading System Assembly

Subsequently, description will be given of the assembly of the image reading system 110 with reference to FIG. 20 to FIG. 29. FIG. 20 shows the end section on the rear surface side in the second image reading unit 114, and a target joining member 166 is attached to the end section on the rear surface side so as to be able to be attached and detached. A shaft bearing section 166a which bears the rotation shaft 139 of the first member 138 and an engaging section 166b which engages with a joining member 168 which will be described below are provided in the target joining member 166.

Subsequently, as shown in FIG. 21, the cover section 132 is attached to the housing 134 of the second image reading unit 114. In detail, the rotation shaft 139 of the first member 138 of the cover section 132 is fitted in the shaft bearing section 166a of the target joining member 166. Due to this, the cover section 132 is able to rotate with respect to the housing 134 with the rotation shaft 139 as a supporting point.

Next, as shown in FIG. 22, the second image reading unit 114 is inserted between the pair of support sections 148 from the front surface side of the connector 116. At this time, the second image reading unit 114 is inserted in the support sections 148 such that the housing 134 is positioned between the second attaching section 116b of the support sections 148 and the eaves section 150 in the height direction. Then, the second image reading unit 114 is abutted by a position regulating section 170 which is provided in the connector 116. In the embodiment, the position regulating section 170 specifies the position of the second image reading unit 114 in the depth direction in the connector 116. In addition, an opening 172 is provided in the position regulating section 170. In the embodiment, the opening 172 is provided at a position which corresponds to a signal line terminal section 178 (refer to FIG. 23) described below which is provided in the end section on the rear surface side of the housing 134 when attaching the second image reading unit 114 to the connector 116.

Next, as shown in FIG. 23 and FIG. 24, the second image reading unit 114 and the connector 116 are joined using the joining member 168 in a state where the second image reading unit 114 abuts the position regulating section 170. A joining member attaching section 174 is provided at a position which corresponds to the target joining member 166 of the second image reading unit 114 in the connector 116. In addition, as shown in FIG. 24, the joining member 168 has a protruding section 168a which extends in the depth direction and of which the end section on the second image reading unit 114 side protrudes downward.

The protruding section 168a is borne by the engaging section 166b of the target joining member 166 so as to be able to relatively move in the height direction. In addition, the protruding section 168a is engaged with the engaging section 166b on the rear surface side in the depth direction in a state of being borne by the engaging section 166b. That is, by engaging the protruding section 168a and the engaging section 166b, the second image reading unit 114 is restricted by the connector 116 in the depth direction.

Then, the second image reading unit 114 and the connector 116 are joined by attaching the joining member 168 to the joining member attaching section 174 using a fastening member 176 such as a screw. That is, the second image reading unit 114 and the connector 116 are integrated. In addition, in the embodiment, since the target joining member 166 and the engaging section 166b are able to relatively move in the height direction, the housing 134 is able to be displaced in the height direction between the second attaching section 116b and the eaves section 150.

Next, as shown in FIG. 25, the relay section 154 and the second image reading unit 114 are electrically connected by inserting the other end of the signal line cable 156 which extends from the relay section 154 into the signal line terminal section 178 (refer to FIG. 20) which is provided in the end section of the second image reading unit 114 on the depth direction side. Due to this, the operation for mounting the second image reading unit 114 with respect to the connector 116 is completed. Here, in the embodiment, the signal line cable 156 also supplies power from the relay section 154 to the second image reading unit 114 in addition to sending and receiving data.

Subsequently, description will be given of mounting the first image reading unit 112 with respect to the connector 116 with reference to FIG. 26 to FIG. 29. A locking section 180 (refer to FIG. 15 and FIG. 27) in the form of a hook is provided in the first attaching section 116a of the connector 116. In addition, a target locking section 182 (refer to FIG. 27) which is able to be engaged with the locking section 180 is provided on the bottom section of the first image reading unit 112.

As shown in FIG. 26, the first image reading unit 112 is mounted on the upper section of the connector 116, specifically, on the first attaching section 116a. At this time, the first image reading unit 112 is mounted on the first attaching section 116a on a side which is separated from the slope member 142 in the depth direction, that is, toward the rear surface side. Due to this, the locking section 180 of the first attaching section 116a is in a state of being borne by the target locking section 182 of the bottom section of the first image reading unit 112 (refer to the two-dot chain line section in FIG. 27). Then, after mounting the first image reading unit 112 on the first attaching section 116a, the first image reading unit 112 is slid to the front side in the depth direction, that is, on the slope member 142 side. Due to this, the locking section 180 of the first attaching section 116a engages with the target locking section 182 (refer to the solid line section in FIG. 27).

Next, as shown in FIG. 28, the first image reading unit 112 and the connector 116 are joined by the joining member 184. In detail, the joining member 184 over the rear surface of the first image reading unit 112 and the rear surface of the connector 116 is attached to the connector 116 by the fastening member 186 such as a screw. Due to this, the first image reading unit 112 and the connector 116 are integrated.

Then, as shown in FIG. 29, on the rear surface side of the connector 116, the power line cable 188 which extends from the relay section 154 and the signal line cable 190 are respectively connected to the power supply terminal and the signal line terminal which are provided on the rear surface of the first image reading unit 112. Due to this, the operation for mounting the first image reading unit 112 with respect to the connector 116 is completed. Then, in this state, the first image reading unit 112 and the second image reading unit 114 are integrated via the connector 116.

In addition, as shown in FIG. 29, the power supply terminal 192 for supplying power to the first image reading unit 112 and the second image reading unit 114 via the relay section 154 and the signal line terminal 194 for sending and receiving control signals for data such as image reading data or for operating each of the image reading units 112 and 114 to and from the first image reading unit 112 and the second image reading unit 114 via the relay section 154 are provided on the rear surface of the connector 116.

In addition, the power supply terminal 192 is connected to an external power source or the like by a power supply cable which is not shown in the diagram. In addition, the signal line terminal 194 is also connected to an external input device such as PC by a signal line cable which is not shown in the diagram.

Modification of Second Embodiment (1) The embodiment has a configuration in which power is supplied and signals are sent and received using the signal line cable 156 between the second image reading unit 114 and the connector 116; however, the embodiment may have a configuration in which the power supply and the sending and receiving of signals are performed using separate cables.

(2) The embodiment has a configuration in which power is supplied and signals are sent and received respectively by the power line cable 188 and the signal line cable 190 between the first image reading unit 112 and the connector 116; however, the embodiment may have a configuration in which power is supplied and signals are sent and received by one cable as between the second image reading unit 114 and the connector 116.

To summarize the above description, the image reading system 110 is provided with the first image reading unit 112 which is able to read a surface of the medium which is transported along the transport path, the second image reading unit 114 which is able to read a surface of the medium mounted on the medium reading surface 134a, the connector 116 on which the first image reading unit 112 and the second image reading unit 114 are respectively mounted so as to be able to be attached and detached and which integrates the first image reading unit 112 and the second image reading unit 114 in a state where the first image reading unit 112 and the second image reading unit 114 are mounted.

According to the configuration described above, since the first image reading unit 112 and the second image reading unit 114 are respectively mounted on the connector 116 so as to be able to be attached and detached, for example, when transporting the image reading system 110, it is possible to remove and transport at least one of the first image reading unit 112 and the second image reading unit 114 from the connector 116. That is, it is possible to remove parts of the image reading system 110 and carry out the transportation separately a plurality of times without integrally transporting the image reading system 110 and it is possible to reduce the transport weight per time. As a result, since it is possible to easily carry the image reading system 110, it is possible to improve the transportability of the image reading system 110.

In addition, in the image reading system 110, for example, when the first image reading unit 112 or the second image reading unit 114 malfunctions, it is possible to carry on using the first image reading unit 112 or the second image reading unit 114 which are not malfunctioning even while the malfunctioning first image reading unit 112 or second image reading unit 114 is removed from the connector 116 and sent for repair. In addition, since it is possible to quickly restore the state of the first image reading unit 112 or the second image reading unit 114 by replacing the malfunctioning first image reading unit 112 or second image reading unit 114, it is possible to shorten the period during which the image reading system 110 is not able to be used due to the malfunction. Accordingly, it is possible to improve the usability of the image reading system 110.

In addition, in the embodiment, the first image reading unit 112 is mounted on the upper surface of the connector 116 and the second image reading unit 114 is mounted on the connector 116 from the side of the connector 116. According to the configuration described above, when mounting the first image reading unit 112 and the second image reading unit 114 with respect to the connector 116, the second image reading unit 114 is mounted on the connector 116 from the side as opposed to mounting the first image reading unit 112 on the connector 116 from above. Due to this, in the operation for mounting each of the image reading units 112 and 114 on the connector 116, since the mounting paths of the first image reading unit 112 and the second image reading unit 114 do not interfere with each other, it is possible to improve the operability in the mounting operation on the connector 116.

In addition, according to the embodiment, the connector 116 has the first attaching section 116a which is able to support at least a part of the bottom surface of the first image reading unit 112 and the second attaching section 116b which is able to support at least a part of the bottom surface of the second image reading unit 114. Then, the first attaching section 116a is able to support a region with a length of ½ or more of the bottom surface of the first image reading unit 112 in a predetermined direction, and the second attaching section 116b is able to support a region with a length of ½ or more of the bottom surface of the second image reading unit 114 in a predetermined direction.

According to the configuration described above, in the connector 116, the first attaching section 116a is able to support a region with a length of ½ or more in the bottom surface of the first image reading unit 112 in the depth direction and the second attaching section 116b is able to support a region with a length of ½ or more in the bottom surface of the second image reading unit 114 in the depth direction. That is, when carrying the image reading system 110 in a state where the first image reading unit 112 and the second image reading unit 114 are mounted on the image reading system 110, since half or more of the bottom surfaces of the first image reading unit 112 and the second image reading unit 114 are supported by the connector 116, it is possible to suppress an excessive load from being generated at the joining section between the connector 116 and the first image reading unit 112 and the joining section between the connector 116 and the second image reading unit 114 and it is possible to suppress the image reading system 110 from being damaged.

In addition, according to the embodiment, the handle section 152 is provided at a position which corresponds to the center position G1 of the connector 116 in a state where the first image reading unit 112 and the second image reading unit 114 are attached to the connector 116.

According to the configuration described above, when carrying the image reading system 110 in a state where the first image reading unit 112 and the second image reading unit 114 are mounted on the connector 116, it is possible to stably carry the image reading system 110.

According to the embodiment, the second image reading unit 114 is provided with the slope member 142 for guiding the medium which is discharged from the first image reading unit 112 to the upper section of the second image reading unit 114, that is, the medium mounting section 132a of the cover section 132. Then, the target locking section 182 is provided at the lower section of the first image reading unit 112 and the locking section 180 which is able to be engaged with the target locking section 182 of the first image reading unit 112 is provided at the upper section of the connector 116. The locking section 180 and the target locking section 182 are engaged by sliding the first image reading unit 112 to the slope member 142 side after mounting the first image reading unit 112 on the upper section of the connector 116, that is, the first attaching section 116a.

According to the configuration described above, since the first image reading unit 112 is slid to the slope member 142 side after being mounted on the upper section of the connector 116, that is, on a side of the first attaching section 116a which is separated from the slope member 142, when mounting the first image reading unit 112 on the first attaching section 116a of the connector 116, it is possible to suppress the first image reading unit 112 from interfering with the slope member 142 and it is possible to suppress the slope member 142 from being damaged.

In addition, in the embodiment, the eaves section 150 which covers a part of the second image reading unit 114 when the second image reading unit 114 is mounted is provided in the connector 116.

According to the configuration described above, the eaves section 150 is able to regulate the upward displacement of the second image reading unit 114 when the second image reading unit 114 is mounted on the connector 116.

In addition, in the embodiment, the connector 116 is provided with the pair of support sections 148 which protrude in the medium discharging direction in the first image reading unit 112 and which face each other at an interval in a direction which intersects with the discharging direction, and the eaves section 150 is provided in the pair of support sections 148.

In addition, in the embodiment, the image reading system 110 is provided with a configuration in which the gap 164 is formed between the bottom section of the second image reading unit 114 and the connector 116 in a state where the connector 116 on which the second image reading unit 114 is mounted is mounted on the installation surface 158 and, by lifting the connector 116 from the installation surface 158, the gap 164 disappears and the second image reading unit 114 is supported by the connector 116.

Since at least a part of the medium reading surface 134a (which configures the second image reading unit 114) in the embodiment overlaps at least a part of the first image reading unit 112 in the height direction of the image reading system, the second image reading unit 114 is in a state of being inserted in the region of the first image reading unit 112 in a direction which intersects with the height direction, specifically, in the image reading system depth direction in the embodiment, and it is possible to reduce the size of the image reading system in the depth direction.

In addition, since at least a part of the cover section 132 (which configures the second image reading unit 114) in the embodiment overlaps at least a part of the first image reading unit 112 in the height direction, the second image reading unit 114 is in a state of being inserted in the region of the first image reading unit 112 in the direction which intersects with the height direction, specifically, in the depth direction in the embodiment, and it is possible to reduce the size of the image reading system in the depth direction.

In addition, since at least a part of the medium reading surface 134a (which configures the second image reading unit 114) in the embodiment overlaps at least a part of the medium support section 118 (which configures the first image reading unit 112) in a closed position in the height direction, the second image reading unit 114 is in a state of being inserted in the region of the first image reading unit 112 in the depth direction, and it is possible to reduce the size of the image reading system in the depth direction.

In addition, since at least a part of the cover section 132 (which configures the second image reading unit 114) in the embodiment overlaps at least a part of the pair of discharging rollers 128 (which configure the first image reading unit 112) in the height direction, the second image reading unit 114 is in a state of being inserted in the region of the first image reading unit 112 in the depth direction, and it is possible to reduce the size of the image reading system in the depth direction.

In addition, since at least a part of the cover section 132 (which configures the second image reading unit 114) in the embodiment overlaps at least a part of the image reading section 126 which is provided in the first image reading unit 112 in the height direction, the second image reading unit 114 is in a state of being inserted in the region of the first image reading unit 112 in the depth direction, and it is possible to reduce the size of the image reading system in the depth direction.

In addition, since at least a part of the medium reading surface 134a (which configures the second image reading unit 114) in the embodiment is positioned between the pair of discharging rollers 128 and the discharge opening 130 in the medium discharging direction in the first image reading unit 112, the second image reading unit 114 is in a state of being inserted in the region of the first image reading unit 112 in the medium discharging direction, and it is possible to reduce the size of the image reading system in the discharging direction.

Here, the invention is not limited to the embodiments described above and various types of modifications are possible within the range of the invention described in the claims and, needless to say, these are included in the range of the invention.

The entire disclosure of Japanese Patent Application No. 2015-125542 filed on Jun. 23, 2015, No. 2015-235445 filed on Dec. 2, 2015, No. 2015-125547 filed on Jun. 23, 2015, No. 2015-050049 filed on Mar. 12, 2015 and No. 2015-050050 filed on Mar. 12, 2015 are expressly incorporated by reference herein.

What is claimed is:
1. An image reading apparatus comprising:
 a first image reading unit which reads both surfaces of a medium which is linearly transported along a transport path;
 a second image reading unit reads a surface of the medium once the medium is mounted on a medium reading surface;

an opening/closing member switches between a closed position and an opened position with respect to the medium reading surface; and a connector on which the first image reading unit and the second image reading unit are respectively mounted so as to be able to be attached and detached and which integrates the first image reading unit and the second image reading unit in a state where the first image reading unit and the second image reading unit are mounted, wherein at least a part of the medium reading surface overlaps at least a part of the first image reading unit in an apparatus depth direction.

2. An image reading apparatus comprising:

a first image reading unit which reads both surfaces of a medium which is linearly transported along a transport path;

a second image reading unit which reads a surface of a medium mounted on a medium reading surface;

an opening/closing member switches between a closed position and an opened position with respect to the medium reading surface; and a connector on which the first image reading unit and the second image reading unit are respectively mounted so as to be able to be attached and detached and which integrates the first image reading unit and the second image reading unit in a state where the first image reading unit and the second image reading unit are mounted, wherein at least a part of the opening/closing member overlaps at least a part of the first image reading unit in an apparatus depth direction.

3. The image reading apparatus according to claim 1, further comprising:

a medium support section which is able to switch between a closed position with respect to the first image reading unit and an opened position with respect to the first image reading unit, the opened position being rotated from the closed position with respect to the first image reading unit to support the medium in a position in which transport is possible on the transport path, wherein, in the closed position, at least a part of the medium reading surface overlaps at least a part of the medium support section in the apparatus depth direction.

4. The image reading apparatus according to claim 1, further comprising:

a discharge unit which discharges a medium which is transported along the transport path in the first image reading unit, wherein at least a part of the opening/closing member overlaps at least a part of the discharge unit in the apparatus depth direction.

5. The image reading apparatus according to claim 1, further comprising:

an image reading section which reads at least one surface of a medium which is transported along the transport path in the first image reading unit, wherein at least a part of the opening/closing member overlaps at least a part of the image reading section in the apparatus depth direction.

6. The image reading apparatus according to claim 1, further comprising:

a discharge unit which discharges a medium which is transported along the transport path in the first image reading unit; and a discharge opening which is provided on the transport path on a downstream side in a transport direction with respect to the discharge unit, wherein at least a part of the medium reading surface is positioned between the discharge unit and the discharge opening in a medium discharging direction in the first image reading unit.

7. The image reading apparatus according to claim 2, wherein an upper section of the opening/closing member is formed as a medium mounting section for mounting a medium which is discharged from the first image reading unit, a slope member which is able to be displaced with respect to the opening/closing member is provided in the opening/closing member, and the slope member takes a guide position for guiding the medium which is discharged from the first image reading unit to the medium mounting section in a case where the opening/closing member is in a closed position with respect to the second image reading unit and takes a non-guide position which is retracted from the transport path by being displaced with respect to the opening/closing member in a case where the opening/closing member is switched from a closed position with respect to the second image reading unit to an opened position.

8. The image reading apparatus according to claim 7, wherein the opening/closing member is provided with a first member which is attached to the second image reading unit so as to be able to rotate and in which the slope member is provided, and a second member which is linked so as to be able to rotate with respect to the first member.

9. The image reading apparatus according to claim 7, wherein the slope member comes into contact with the first image reading unit and has a contact section which is able to be displaced with respect to the first image reading unit in the state of being in contact.

10. The image reading apparatus according to claim 9, wherein the slope member extends in a direction which intersects with the medium discharging direction in the first image reading unit, and the contact section is provided at a position shifted from a region through which the medium passes in the intersecting direction.

11. The image reading apparatus according to claim 9, wherein the contact section is configured by a roller member which is able to rotate in a state of being in contact with the first image reading unit.

12. The image reading apparatus according to claim 1, wherein the first image reading unit is mounted on an upper surface of the connector and the second image reading unit is mounted on the connector from a side of the connector.

13. The image reading apparatus according to claim 1, wherein the connector has a first support surface which is able to support at least a part of a bottom surface of the first image reading unit and a second support surface which is able to support at least a part of a bottom surface of the second image reading unit, the first support surface is able to support a region with a length of ½ or more of the bottom surface of the first image reading unit in a predetermined direction, and the second support surface is able to support a region with a length of ½ or more of the bottom surface of the second image reading unit in a predetermined direction.

14. The image reading apparatus according to claim 1,
wherein a handle section is provided in the connector at a position which corresponds to a center position of the connector in a state where the first image reading unit and the second image reading unit are attached.

15. The image reading apparatus according to claim 1,
wherein the connector is provided with a position regulating section which specifies a position of the second image reading unit in a depth direction.

16. The image reading apparatus according to claim 15, wherein the connector is provided with a cable relay section at a rear surface side of the position regulating section in the depth direction.

17. An image reading apparatus comprising:
a first image reading unit which reads both surfaces of a medium which is linearly transported along a transport path;
a second image reading unit reads a surface of the medium once the medium is mounted on a medium reading surface;
an opening/closing member which switches between a closed position and an opened position with respect to the medium reading surface;
a discharge unit which discharges a medium which is transported along the transport path in the first image reading unit;
a discharge opening which is provided on the transport path on a downstream side in a transport direction with respect to the discharge unit; and
a media support section which supports the medium and is attached to the first image reading unit,
wherein the first image reading unit is detachably mounted above the second image reading unit,
wherein at least a part of the medium reading surface is positioned between the discharge unit and the discharge opening in a medium discharging direction in the first image reading unit.

18. An image reading apparatus comprising:
a first image reading unit which reads both surfaces of a medium which is linearly transported along a transport path;
a second image reading unit which reads a surface of a medium mounted on a medium reading surface;
an opening/closing member which switches between a closed position and an opened position with respect to the medium reading surface;
a discharge unit which discharges a medium which is transported along the transport path in the first image reading unit;
a discharge opening which is provided on the transport path on a downstream side in a transport direction with respect to the discharge unit; and
a media support section which supports the medium and is attached to the first image reading unit,
wherein the first image reading unit is detachably mounted above the second image reading unit,
wherein at least a part of the medium reading surface is positioned between the discharge unit and the discharge opening in a medium discharging direction in the first image reading unit, and
wherein at least a part of the medium reading surface overlaps at least a part of the first image reading unit in an apparatus depth direction.

* * * * *